(12) United States Patent
Mondal et al.

(10) Patent No.: US 12,731,231 B2
(45) Date of Patent: Sep. 8, 2026

(54) DOCUMENT DEWARPING

(71) Applicant: ADOBE INC., San Jose, CA (US)

(72) Inventors: Prasenjit Mondal, Daspur (IN); Ayush Pant, Noida (IN); Sachin Soni, New Delhi (IN)

(73) Assignee: ADOBE INC., San Jose, CA (US)

( * ) Notice: Subject to any disclaimer, the term of this patent is extended or adjusted under 35 U.S.C. 154(b) by 447 days.

(21) Appl. No.: 18/183,204

(22) Filed: Mar. 14, 2023

(65) Prior Publication Data

US 2024/0311985 A1 Sep. 19, 2024

(51) Int. Cl.

*G06T 5/80* (2024.01)
*G06T 3/18* (2024.01)
*G06T 7/13* (2017.01)
*G06T 7/60* (2017.01)
*G06T 17/20* (2006.01)

(52) U.S. Cl.

CPC .................. *G06T 5/80* (2024.01); *G06T 3/18* (2024.01); *G06T 7/13* (2017.01); *G06T 7/60* (2013.01); *G06T 17/20* (2013.01); *G06T 2207/20081* (2013.01); *G06T 2207/20084* (2013.01); *G06T 2207/30176* (2013.01)

(58) Field of Classification Search

USPC .......................................................... 382/190
See application file for complete search history.

(56) References Cited

U.S. PATENT DOCUMENTS

2010/0014770 A1* 1/2010 Huggett .................... G06T 3/00 382/254
2013/0128057 A1* 5/2013 Cho ....................... H04N 17/04 348/189
2013/0162681 A1* 6/2013 Peterson ................... G06T 3/18 345/647
2014/0368891 A1* 12/2014 Beato .................. G06V 10/243 382/165
2016/0283787 A1* 9/2016 Nepomniachtchi .. G06V 30/166
2017/0076169 A1* 3/2017 Campbell ................. G06T 3/18
2017/0337668 A1* 11/2017 Edgar ....................... G06T 5/70
2018/0144439 A1* 5/2018 Stepanenko .............. G06T 3/12
2018/0220156 A1* 8/2018 Kim .......................... G06T 3/18
2018/0255287 A1* 9/2018 Chiu ....................... G06T 15/00
2019/0371008 A1* 12/2019 Peterson .................. G06T 9/20
2021/0097662 A1* 4/2021 Wang ...................... G06N 3/088
2022/0207668 A1* 6/2022 Kim .......................... G06T 5/20

(Continued)

OTHER PUBLICATIONS

Markovitz et al. (Amir Markovitz, Inbal Lavi, Or Perel, Shai Mazor, and Roee Litman ,"Can You Read Me Now? Content Aware Rectication using Angle Supervision", Aug. 5, 2020, https://arxiv.org/abs/2008.02231, pp. 1-22) (Year: 2020).*

(Continued)

*Primary Examiner* — Chineyere Wills-Burns
*Assistant Examiner* — Aaron Timothy Bonansinga
(74) *Attorney, Agent, or Firm* — F. CHAU & ASSOCIATES, LLC

(57) ABSTRACT

Systems and methods for image dewarping are described. The method includes obtaining an image depicting a warped object and generating a parametric curve corresponding to an edge of the warped object. Then, a mesh overlay is generated for the warped object based on the parametric curve. A dewarped image is generated based on the mesh overlay.

20 Claims, 12 Drawing Sheets

(56) References Cited

U.S. PATENT DOCUMENTS

| | | | | |
|---|---|---|---|---|
| 2022/0292258 | A1* | 9/2022 | Zeng | G06V 30/413 |
| 2023/0010202 | A1* | 1/2023 | Fujimoto | G06N 3/044 |
| 2023/0085156 | A1* | 3/2023 | Prasad | A63F 13/67 709/219 |
| 2023/0186444 | A1* | 6/2023 | Perry | G06T 5/50 345/634 |
| 2023/0377363 | A1* | 11/2023 | Sun | G06V 30/18086 |
| 2024/0112315 | A1* | 4/2024 | Powell | G06T 3/12 |

OTHER PUBLICATIONS

Markovitz et al. (Amir Markovitz, Inbal Lavi, Or Perel, Shai Mazor, and Roee Litman "Can You Read Me Now? Content Aware Rectication using Angle Supervision", Aug. 5, 2020, pp. 1-22) (Year: 2020).*

Bradley, et al, "Adaptive Thresholding using the Integral Image", Journal of Graphics GPU and Game Tools, vol. 12, No. 2, pp. 13-21, Jan. 2007, 6 pages.

Brown, et al, "Restoring 2d content from distorted documents", IEEE Transactions on Pattern Analysis and Machine Intelligence, vol. 29, No. 11, pp. 1904-1916, Nov. 2007, 13 pages.

Das, et al, "DewarpNet: Single-Image Document Unwarping with Stacked 3D and 2D Regression Networks", 131-140, 10.1109/ICCV.2019.00022, 2019, 10 pages.

Das, et al, "End-to-end Piece-wise Unwarping of Document Images", 2021 IEEE/CVF International Conference on Computer Vision (ICCV), Montreal, QC, Canada, pp. 4268-4277, doi: 10.1109/ICCV48922.2021.00423, Oct. 10-17, 2021, 10 pages.

Das, et al, "The Common Fold: Utilizing the Four-Fold to Dewarp Printed Documents from a Single Image", DocEng 17: Proceedings of the 2017 ACM Symposium on Document Engineering, pp. 125-128, https://doi.org/10.1145/3103010.3121030, Aug. 31, 2017, 4 pages.

Feng, et al, "DocTr: Document Image Transformer for Geometric Unwarping and Illumination Correction", arXiv preprint arXiv:2110.12942v1 [cs.CV] Oct. 25, 2021, 9 pages.

Feng, et al, "DocTr: Document Image Transformer for Geometric Unwarping and Illumination Correction", arXiv preprint arXiv:2110.12942v2 [cs.CV] Oct. 8, 2022, 9 pages.

Isola, et al, "Image-to-Image Translation with Conditional Adversarial Networks", arXiv preprint arXiv:1611.07004v1 [cs.CV] Nov. 21, 2016, 16 pages.

Isola, et al, "Image-to-Image Translation with Conditional Adversarial Networks", arXiv preprint arXiv:1611.07004v3 [cs.CV] Nov. 26, 2018, 17 pages.

Jiang, et al, "Revisiting Document Image Dewarping by Grid Regularization", Proceedings of the IEEE/CVF Conference on Computer Vision and Pattern Recognition (CVPR), Jun. 2022, 10 pages.

Kil, et al, "Robust Document Image Dewarping Method Using Text-Lines and Line Segments", 2017 14th IAPR International Conference on Document Analysis and Recognition (ICDAR), Kyoto, Japan, Nov. 9-15, 2017, pp. 865-870, 6 pages.

Kim, et al, "Document dewarping via text-line based optimization", Pattern Recognition, vol. 48, Issue 11, p. 3600-3614, 10.1016/j.patcog.2015.04.026, Nov. 2015, 15 pages.

Koo, et al, "Composition of a Dewarped and Enhanced Document Image From Two View Images", IEEE Transactions on Image Processing, vol. 18, No. 7, pp. 1551-1562, Jul. 2009, 12 pages.

Liu, et al, "Geometric rectification of document images using adversarial gated unwarping network", Pattern Recognition, vol. 108, Dec. 1, 2020, 13 pages.

Liu, et al, "Restoring camera-captured distorted document images", International Journal on Document Analysis and Recognition, vol. 18, No. 2, pp. 111-124, DOI 10.1007/s10032-014-0233-8, Nov. 26, 2014, 14 pages.

Lu, et al., "Document Flattening through Grid Modeling and Regularization", 18th International Conference on Pattern Recognition (ICPR'06), Hong Kong, pp. 971-974, doi: 10.1109/ICPR.2006.458, Aug. 20-24, 2006, 4 pages.

Ma, et al, "DocUNet: Document Image Unwarping via a Stacked U-Net", 2018 IEEE/CVF Conference on Computer Vision and Pattern Recognition, Salt Lake City, UT, USA, 2018, pp. 4700-4709, doi: 10.1109/CVPR.2018.00494, Jun. 1, 2018, 10 pages.

Markovitz, et al, "Can You Read Me Now? Content Aware Rectification using Angle Supervision", arXiv preprint arXiv:2008.02231v1 [cs.CV] Aug. 5, 2020, 22 pages.

Meng, et al, "Active Flattening of Curved Document Images via Two Structured Beams", 2014 IEEE Conference on Computer Vision and Pattern Recognition, Jun. 23, 2014, 8 pages.

Meng, et al, "Exploiting Vector Fields for Geometric Rectification of Distorted Document Images", In: Ferrari, V., Hebert, M., Sminchisescu, C., Weiss, Y. (eds) Computer Vision—ECCV 2018. ECCV 2018. Lecture Notes in Computer Science( ), vol. 11220. Springer, Cham. https://doi.org/10.1007/978-3-030-01270-0_11, Sep. 8-14, 2018, 16 pages.

Meng, et al, "Metric Rectification of Curved Document Images", IEEE Transactions on Pattern Analysis and Machine Intelligence 34(4):707-722, DOI:10.1109/TPAMI.2011.151, May 2012, 16 pages.

Stamatopoulos, et al, "Goal-Oriented Rectification of Camera-Based Document Images", IEEE Transactions on Image Processing, vol. 20, No. 4, Apr. 2011, 11 pages.

Tian, et al, "Rectification and 3D Reconstruction of Curved Document Images", Proceedings of the IEEE Computer Society Conference on Computer Vision and Pattern Recognition. 377-384. 10.1109/CVPR.2011.5995540, Jun. 20-25, 2011, 8 pages.

Wang, et al, "Multi-Scale Structural Similarity for Image Quality Assessment", The Thirty-Seventh Asilomar Conference on Signals, Systems and Computers, pp. 1398-1402, vol. 2, Nov. 9-12, 2003, 5 pages.

Xie, et al, "Dewarping Document Image by Displacement Flow Estimation with Fully Convolutional Network", arXiv preprint arXiv:2104.06815v1 [cs.CV] Apr. 14, 2021, 14 pages.

Xie, et al, "Document Dewarping with Control Points", ICDAR 2021: 16th International Conference, Lausanne, Switzerland, Proceedings Part I, pp. 466-480, https://doi.org/10.1007/978-3-030-86549-8_30, Sep. 5-10, 2021, 15 pages; as available at: Xie, et al, "Document Dewarping with Control Points", arXiv preprint, arXiv:2203.10543v1 [cs.CV] Mar. 20, 2022, 15 pages.

You, et al, "Multiview Rectification of Folded Documents", arXiv preprint arXiv:1606.00166v1 [cs.CV] Jun. 1, 2016, 8 pages.

* cited by examiner

Figure 3:
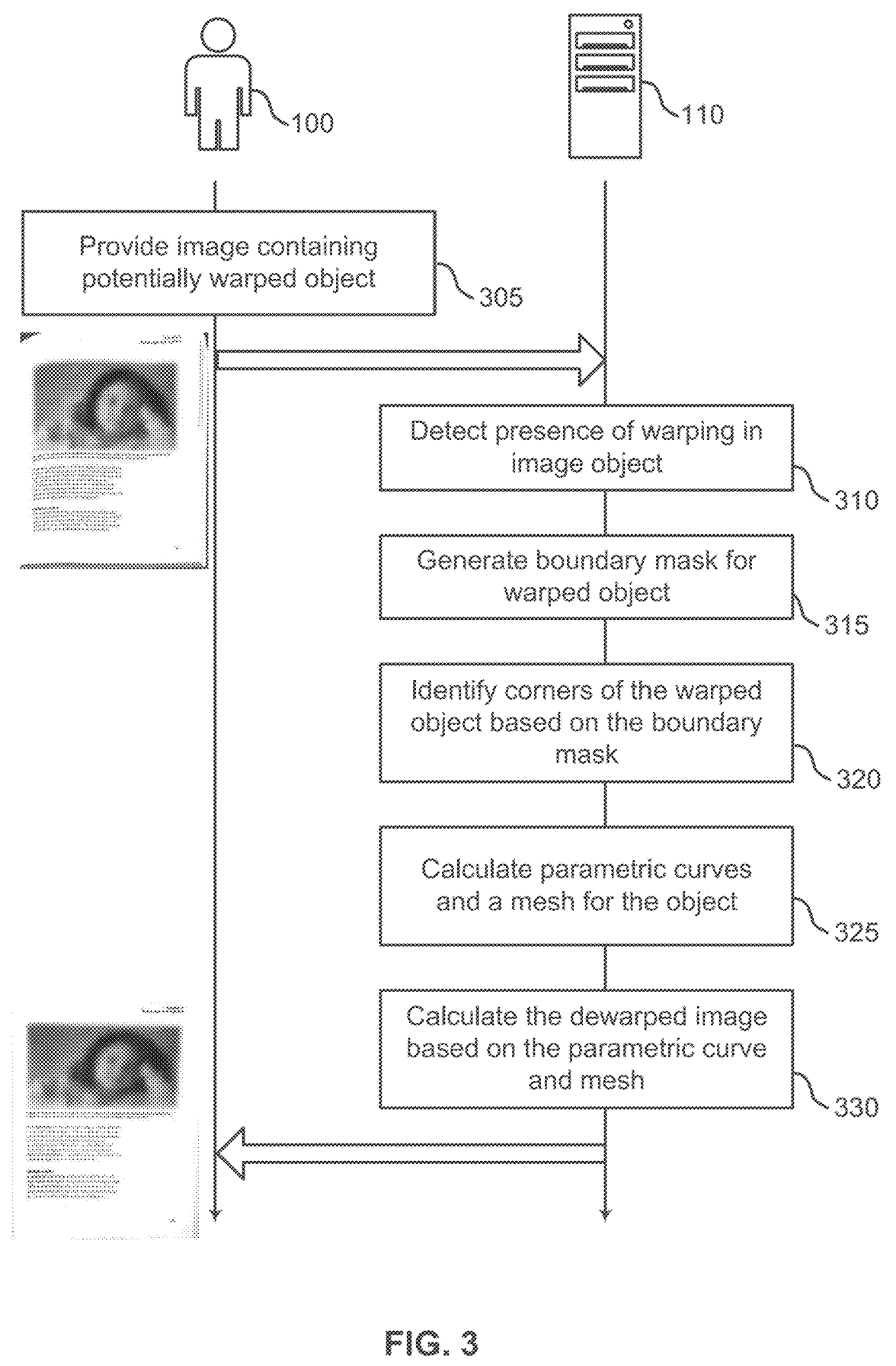

100

110

Provide image containing potentially warped object

305

Detect presence of warping in image object

310

Generate boundary mask for warped object

315

Identify corners of the warped object based on the boundary mask

320

Calculate parametric curves and a mesh for the object

325

Calculate the dewarped image based on the parametric curve and mesh

DOCUMENT DEWARPING

BACKGROUND

The following relates generally to document dewarping, and more specifically to document dewarping utilizing parametric curves and meshes.

Document dewarping refers to a process of automatically straightening images of warped objects. For example, sometimes people capture a digital image of two adjacent pages of a book together at the same time, whether by taking a digital picture or scanning the book pages. In some cases, people scan or photograph individual documents that have been folded, crumpled, wrinkled, and/or creased, where the document no longer lies flat. Due to such deformations, the book or document pages are warped and cropping the page(s) of the scanned or photographed documents based on a quadrilateral makes the resulting page image warped as well.

SUMMARY

Embodiments of the present disclosure provide a dewarping algorithm that reduces or eliminates the problems of image warpage by dewarping the book pages, document, or other object during image capture, where, a document boundary (DB) mask can be computed from an image using a deep learning model.

Embodiments of the present disclosure process the object boundary mask to compute the object corners, and based on the object corners, several equidistant points are estimated along each of four sides. These points can be aligned to the object boundary. To obtain the object outline on each side, the equidistant points can be used to compute a smooth curve using $C^2$ continuous Bezier curve, and a mesh can be computed using the smooth curves. The object can then be dewarped using a perspective correction.

A method, apparatus, and non-transitory computer readable medium for document dewarping are described. One or more aspects of the method, apparatus, and non-transitory computer readable medium include obtaining an image depicting a warped object; generating a parametric curve corresponding to an edge of the warped object; generating a mesh overlay for the warped object based on the parametric curve; and generating a dewarped image based on the mesh overlay.

An apparatus and method for document dewarping are described. One or more aspects of the apparatus and method include one or more processors; a memory coupled to and in communication with the one or more processors, wherein the memory includes instructions executable by the one or more processors to perform operations including: obtaining an image depicting a warped object; generating, using a curve component, a parametric curve corresponding to an edge of the warped object; generating, using a mesh component, a mesh overlay for the warped object based on the parametric curve; and generating, using a dewarping component, a dewarped image based on the mesh overlay.

A method, apparatus, and non-transitory computer readable medium for document dewarping are described. One or more aspects of the method, apparatus, and non-transitory computer readable medium include receiving, at a machine learning model, a training image including a warped object from a training dataset and ground truth pixel classification data; calculating a loss value comparing an output of the machine learning model to the ground truth pixel classification data; and training the machine learning to generate an object boundary mask for the warped object based on the loss value.

BRIEF DESCRIPTION OF THE DRAWINGS

FIG. 3 shows an illustrative depiction of a method of dewarping an image using an object boundary mask and perspective correction, according to aspects of the present disclosure.

DETAILED DESCRIPTION

Figure 1:
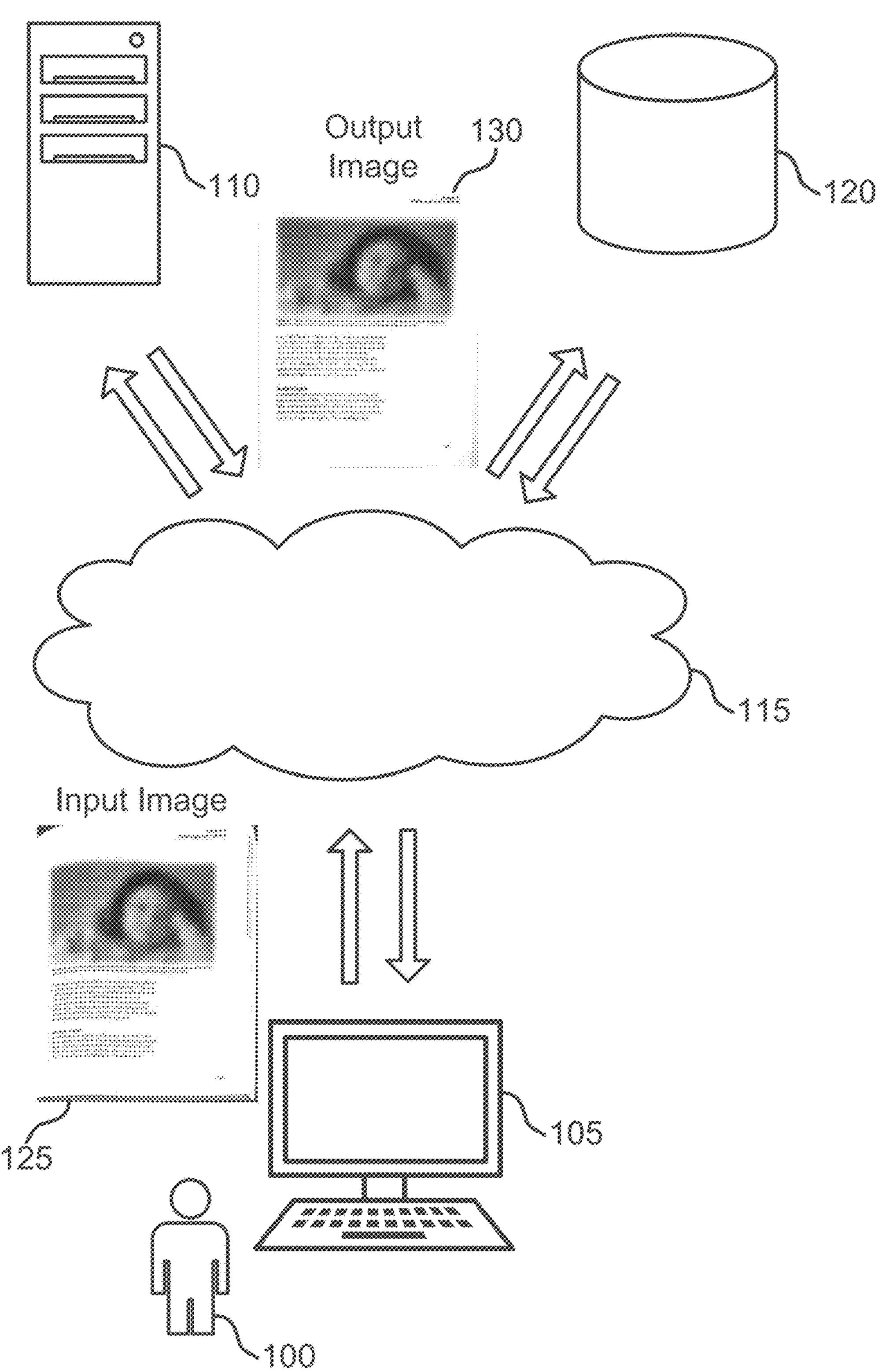
FIG. 1 is an illustrative depiction of a high-level diagram of users interacting with an image dewarping system, including a neural network for generating an object boundary mask, through their devices, according to aspects of the present disclosure.

The present disclosure relates to a fast and efficient document dewarping algorithm that works with mobile devices or other electronic devices with limited storage and/or computational capacities.

Hand-held mobile devices may be used to capture images objects including, for example, books, documents (e.g., orders, invoices, etc.), cards, signs, license plates, stickers, packaging, etc. The presence of physical deformations, like folds, bends, creases, and curves, make the text and other image features (e.g., photos, drawings, etc.) present in such captured images warped. According to embodiments of the present disclosure, the dewarping algorithm can perform a quantitative evaluation based on multi-scale structural similarity (MS-SSIM) and local distortions (LD). The low computational complexity of the described algorithm(s) makes the present disclosure suitable to be used in mobile devices.

In one or more embodiments, statistical analysis can be used to detect whether a document is warped or not. In one or more embodiments, to obtain an exact document outline on each side of the document, equidistant points can be used to compute a smooth curve using a parametric curve, for example, a $C^2$ continuous Bezier curve. A mesh can be computed using the smooth curves, and the document can be dewarped using perspective correction. Digitization of such captured documents can be used for automatic information extraction.

Accordingly, embodiments of the disclosure include a boundary model that provides improved performance with a reduced model size compared to conventional dewarping models. The running time may also be reduced. For example, in one embodiment, the boundary mask model has a 3 MB (Megabyte) model size that improves the time complexity and make the model suitable for mobile devices or other electronic devices with limited storage and/or computational capacities. In an embodiment, the average running time to dewarp a document is approximately 200 ms (milliseconds). Some embodiments have low computational complexity, and can detect the presence of warps in documents and dewarp the documents. According to various embodiments, the system use of $C^2$ continuous Bezier curves can make documents dewarping very efficient. The existing algorithms fail to identify the correct document boundaries and hence cannot dewarp documents, whereas the present algorithm is successfully able to dewarp documents.

Network Architecture

In FIGS. 1-4 and 12, an apparatus and method for document dewarping are described. One or more aspects of the apparatus and method include one or more processors; a memory coupled to and in communication with the one or more processors, wherein the memory includes instructions executable by the one or more processors to perform operations including: obtaining an image depicting a warped object; generating, using a curve component, a parametric curve corresponding to an edge of the warped object; generating, using a mesh component, a mesh overlay for the warped object based on the parametric curve; and generating, using a dewarping component, a dewarped image based on the mesh overlay.

Some examples of the apparatus and method further include generating an object boundary mask for the warped object using a machine learning model, wherein the parametric curve is generated based on the object boundary mask.

In some aspects, the machine learning model comprises a plurality of convolution layers.

FIG. 1 is an illustrative depiction of a high-level diagram of users interacting with an image dewarping system, including a neural network for generating an object boundary mask, through their devices according to aspects of the present disclosure. The example shown includes user 100, user device 105, image dewarping apparatus 110, cloud 115, database 120, input image 125, and output image 130. Image dewarping apparatus 110 is an example of, or includes aspects of, the corresponding element described with reference to FIG. 2. As an example shown in FIG. 1, user 100 provides user input. The user input is transmitted to image dewarping apparatus 110, e.g., via user device 105 and cloud 115.

In various embodiments, the image dewarping apparatus 110 is configured to generate an object boundary mask, generate a parametric curve corresponding to an edge of the warped object using the object boundary mask, generate a mesh overlay for the warped object based on the parametric curve, and dewarp the image through perspective correction based on the mesh overlay. User device 105 may be a personal computer, laptop computer, mainframe computer, palmtop computer, personal assistant, mobile device, or any other suitable processing apparatus. In some non-limiting examples, user device 105 includes software that incorporates an image dewarping application. In some examples, the image dewarping application on user device 105 may include functions of image dewarping apparatus 110.

In various embodiments, a user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device 105 and rendered locally by a browser.

dewarping apparatus 110 can include a computer implemented network comprising a user interface, a machine learning model, curve component, mesh component, dewarping component, and warp component. Image dewarping apparatus 110 can also include a processor unit, a memory unit, and a training component. The training component is used to train a machine learning model. Additionally, image dewarping apparatus 110 can communicate with database 120 via cloud 115. In some cases, the architecture of the image generation network is also referred to as a network or a network model. Further detail regarding the architecture of image dewarping apparatus 110 is provided with reference to FIGS. 2-4. Further detail regarding the operation of image dewarping apparatus 110 is provided with reference to FIGS. 5-11.

In some cases, image dewarping apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by user 100. The term "cloud" is sometimes used to describe data centers available to many users (e.g., user 100) over the Internet. Some large cloud networks have functions distributed over multiple locations from central servers. A server is designated an edge server if the server has a direct or close connection to a user (e.g., user 100). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
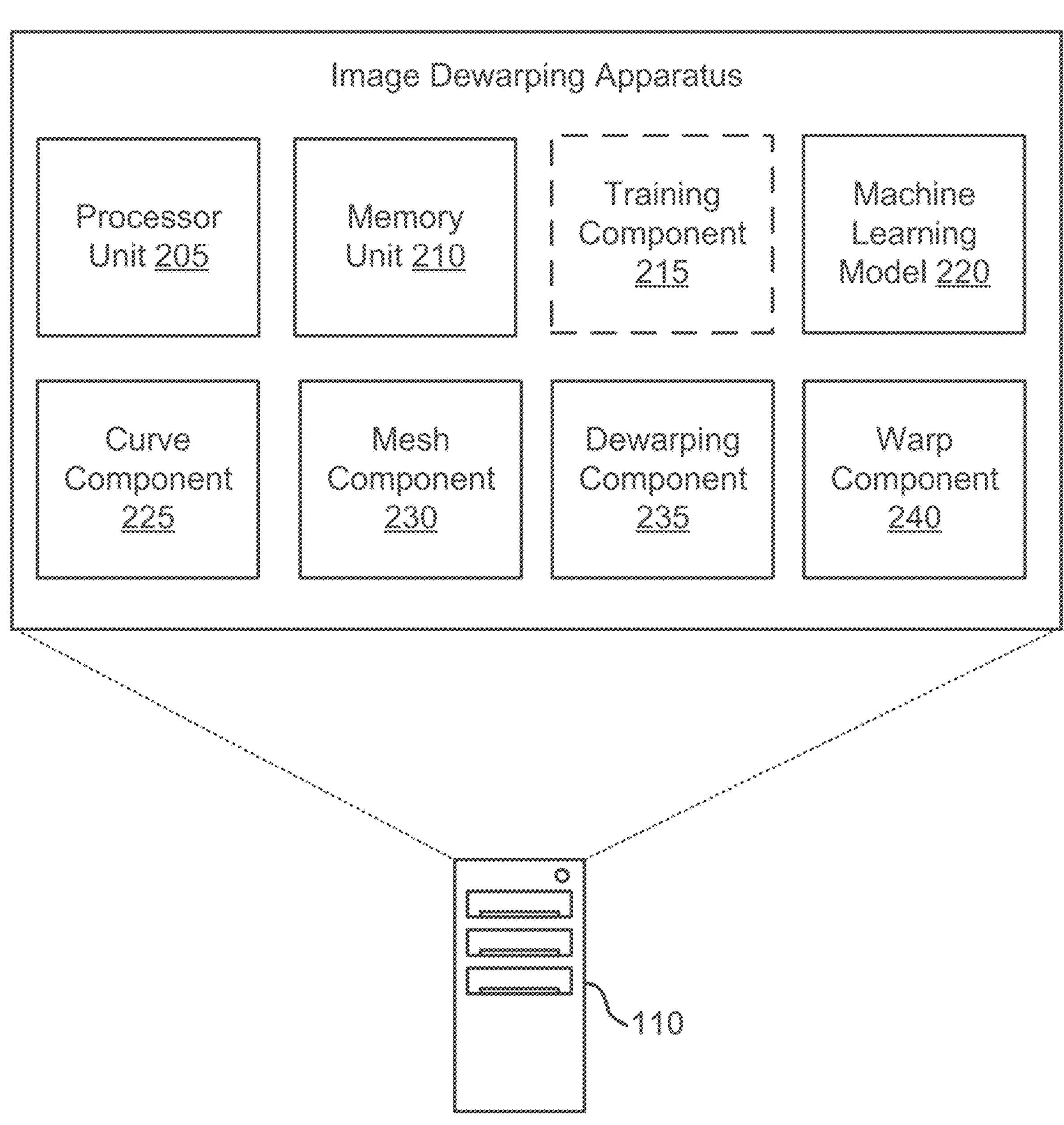
FIG. 2 shows an example of an image dewarping apparatus, according to aspects of the present disclosure.

FIG. 2 shows an example of an image dewarping apparatus 110 according to aspects of the present disclosure. The example shown includes image dewarping apparatus 110, processor unit 205, memory unit 210, training component 215, machine learning model 220, curve component 225, mesh component 230, dewarping component 235, and warp component 240. Image dewarping apparatus 110 is an example of, or includes aspects of, the corresponding element described with reference to FIG. 1.

According to some aspects, processor unit 205 comprise one or more processors. Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special-purpose components for modem processing, baseband processing, digital signal processing, or transmission processing. Processor unit 205 is an example of, or includes aspects of, the processor described with reference to FIG. 12.

According to some aspects, memory unit 210 comprise a memory coupled to and in communication with the one or more processors, where the memory includes instructions executable by the one or more processors to perform operations. Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state. Memory unit 210 is an example of, or includes aspects of, the memory subsystem described with reference to FIG. 12.

According to some aspects, training component 215 is used to train a machine learning model to generate an object mask. A loss function is calculated for pixels identified as belonging to an edge of the object mask, where the loss can be greater for pixels farther away from the ground truth edge, and less for pixels closer to the ground truth edge. A false positive (FP) for a pixel near the true object boundary is more acceptable than a FP for a distant pixel. To train the network, images can be collected and the exact document outline annotated manually. The calculated loss can be used to adjust the parameters of the deep learning model (e.g., boundary mask model).

According to some aspects, machine learning model 220 detects a document edge (e.g., a boundary mask). Edge detection is a form of computer vision that focuses on identifying discontinuities in a digital image (e.g., where the brightness changes suddenly). Points where the image brightness changes sharply may be organized into a set of curved line segments (i.e., edges). That is, an edge detector can take an image as input and output a set of points or curved line segments representing edges. In some embodiments, edge detection is accomplished algorithmically (e.g., using the derivatives of Gaussian representation of an image), or using a machine learning model. For example, a machine learning model including a neural network may be trained using annotated images, where the annotations represent known edges in an image.

Accordingly, machine learning model 220 obtains an image depicting a warped object. In some examples, machine learning model 220 generates an object boundary mask for the warped object, where the parametric curve is generated based on the object boundary mask. In some examples, machine learning model 220 computes a boundary line by removing pixels from the object boundary mask, where the parametric curve is generated based on the boundary line.

In some examples, machine learning model 220 computes a corner point for the warped object based on the boundary line, where the parametric curve is generated based on the corner point. In some examples, machine learning model 220 generates a set of estimated lines corresponding to the boundary line. In some examples, machine learning model 220 computes an angle between the set of estimated lines. In some examples, machine learning model 220 generates an updated line based on the angle, where the corner point is computed based on the updated line.

In some examples, machine learning model 220 obtains a low-resolution version of the image and a high-resolution version of the image. In some examples, machine learning model 220 computes a set of boundary points based on the low-resolution version. In some examples, machine learning model 220 calibrates the set of boundary points based on the high-resolution version to obtain a set of updated boundary points, where the parametric curve is based on the set of updated boundary points.

According to some aspects, machine learning model 220 comprise obtaining an image depicting a warped object. In some examples, machine learning model 220 generates an object boundary mask for the warped object using a machine learning model, wherein the parametric curve is generated based on the object boundary mask. In some aspects, the machine learning model 220 includes a set of convolution layers.

According to some aspects, machine learning model 220 obtains an image depicting a warped object. In some examples, machine learning model 220 generates an object boundary mask for the warped object. In some examples, machine learning model 220 computes a boundary line by removing pixels from the object boundary mask. In some examples, machine learning model 220 computes a corner point for the warped object based on the boundary line.

Machine learning model may be an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In some examples, machine learning model 220 includes a convolutional neural network (CNN). A CNNA convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, curve component 225 generates a parametric curve corresponding to an edge of the warped object. In some examples, curve component 225 computes a set of points along the parametric curve. In some examples, curve component 225 generates a set of lines corresponding to the set of points, respectively, where the mesh overlay is based on the set of lines. In some examples, curve component 225 computes a set of parametric curves corresponding to a set of edges of the warped object, respectively. In some examples, curve component 225 computes a set of points along each of the set of parametric curves. In some aspects, the parametric curve is a $C^2$ Bezier curve.

According to some aspects, curve component 225 generates a parametric curve corresponding to an edge of the warped object. According to some aspects, curve component 225 generates a parametric curve corresponding to the corner point. In some examples, curve component 225 computes a set of points along the parametric curve. In some examples, curve component 225 generates a set of lines corresponding to the set of points, respectively. In some examples, curve component 225 computes a set of parametric curves corresponding to a set of edges of the warped object, respectively. In some examples, curve component 225 computes a set of points along each of the set of parametric curves. In some aspects, the set of parametric curves are $C^2$ Bezier curves.

According to some aspects, mesh component 230 generates a mesh overlay for the warped object based on the parametric curve. In some examples, mesh component 230 connects the set of points to obtain the mesh overlay. In some examples, mesh component 230 identifies a set of polygons of the mesh overlay. In some examples, mesh component 230 performs a perspective correction independently for each of the set of polygons, where the dewarped image is based on the perspective correction.

According to some aspects, mesh component 230 generates a mesh overlay for the warped object based on the parametric curve. According to some aspects, mesh component 230 generates a mesh overlay for the warped object based on the set of lines. In some examples, mesh component 230 identifies a set of polygons of the mesh overlay. In some examples, mesh component 230 performs a perspective correction independently for each of the set of polygons. In some examples, mesh component 230 connects the set of points to obtain the mesh overlay.

According to some aspects, dewarping component 235 generates a dewarped image based on the mesh overlay. According to some aspects, dewarping component 235 generates a dewarped image based on the mesh overlay. According to some aspects, dewarping component 235 generates a dewarped image based on the perspective correction.

According to some aspects, warp component 240 computes a warp value for the warped object. In some examples, warp component 240 determines that the warp value is greater than a threshold warp value, where the dewarped image is generated based on the determination. In some examples, warp component 240 computes a line between corners of the warped object. In some examples, warp component 240 identifies a set of points along the edge. In some examples, warp component 240 computes a distance between each of the set of points and the line, where the warp value is based on the distances.

According to some aspects, warp component 240 computes a warp value for the warped object. In some examples, warp component 240 determines that the warp value is greater than a threshold warp value, where the dewarped image is generated based on the determination. In some examples, warp component 240 computes a reference line between corners of the warped object. In some examples, warp component 240 identifies a set of points along the boundary line. In some examples, warp component 240 computes a distance between each of the set of points and the reference line, where the warp value is based on the distances.

The described methods may be implemented or performed by devices that include a general-purpose processor, a digital signal processor (DSP), an application-specific integrated circuit (ASIC), a field programmable gate array (FPGA) or other programmable logic devices, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Document Dewarping

In FIGS. 3-9, a method, apparatus, and non-transitory computer readable medium for document dewarping are described. One or more aspects of the method, apparatus, and non-transitory computer readable medium include obtaining an image depicting a warped object; generating a parametric curve corresponding to an edge of the warped object; generating a mesh overlay for the warped object based on the parametric curve; and generating a dewarped image based on the mesh overlay.

Some examples of the method, apparatus, and non-transitory computer readable medium further include generating an object boundary mask for the warped object using a machine learning model, wherein the parametric curve is generated based on the object boundary mask.

Some examples of the method, apparatus, and non-transitory computer readable medium further include computing a boundary line by removing pixels from the object boundary mask, wherein the parametric curve is generated based on the boundary line.

Some examples of the method, apparatus, and non-transitory computer readable medium further include computing a corner point for the warped object based on the boundary line, wherein the parametric curve is generated based on the corner point.

Some examples of the method, apparatus, and non-transitory computer readable medium further include generating a plurality of estimated lines corresponding to the boundary line. Some examples further include computing an angle between the plurality of estimated lines. Some examples further include generating an updated line based on the angle, wherein the corner point is computed based on the updated line.

Some examples of the method, apparatus, and non-transitory computer readable medium further include computing a plurality of points along the parametric curve. Some examples further include generating a plurality of lines corresponding to the plurality of points, respectively, wherein the mesh overlay is based on the plurality of lines.

Some examples of the method, apparatus, and non-transitory computer readable medium further include computing a plurality of parametric curves corresponding to a plurality of edges of the warped object, respectively. Some examples further include computing a plurality of points along each of the plurality of parametric curves. Some examples further include connecting the plurality of points to obtain the mesh overlay.

Some examples of the method, apparatus, and non-transitory computer readable medium further include computing a warp value for the warped object. Some examples further include determining that the warp value is greater than a threshold warp value, wherein the dewarped image is generated based on the determination.

Some examples of the method, apparatus, and non-transitory computer readable medium further include computing a line between corners of the warped object. Some examples further include identifying a plurality of points along the edge. Some examples further include computing a distance between each of the plurality of points and the line, wherein the warp value is based on the distances.

Some examples of the method, apparatus, and non-transitory computer readable medium further include obtaining a low-resolution version of the image and a high-resolution version of the image. Some examples further include computing a plurality of boundary points based on the low-resolution version. Some examples further include calibrating the plurality of boundary points based on the high-resolution version to obtain a plurality of updated boundary points, wherein the parametric curve is based on the plurality of updated boundary points.

In some aspects, the parametric curve is a $C^2$ Bezier curve. Some examples of the method, apparatus, and non-transitory computer readable medium further include identifying a plurality of polygons of the mesh overlay. Some examples further include performing a perspective correction independently for each of the plurality of polygons, wherein the dewarped image is based on the perspective correction.

A method, apparatus, and non-transitory computer readable medium for document dewarping are described. One or more aspects of the method, apparatus, and non-transitory computer readable medium include obtaining an image depicting a warped object; generating an object boundary mask for the warped object; computing a boundary line by removing pixels from the object boundary mask; computing a corner point for the warped object based on the boundary line; generating a parametric curve corresponding to the corner point; computing a plurality of points along the parametric curve; generating a plurality of lines corresponding to the plurality of points, respectively; generating a mesh overlay for the warped object based on the plurality of lines; identifying a plurality of polygons of the mesh overlay; performing a perspective correction independently for each of the plurality of polygons; and generating a dewarped image based on the perspective correction.

Some examples of the method, apparatus, and non-transitory computer readable medium further include computing a plurality of parametric curves corresponding to a plurality of edges of the warped object, respectively. Some examples further include computing a plurality of points along each of the plurality of parametric curves. Some examples further include connecting the plurality of points to obtain the mesh overlay.

In some aspects, the plurality of parametric curves are $C^2$ Bezier curves. Some examples of the method, apparatus, and non-transitory computer readable medium further include computing a warp value for the warped object. Some examples further include determining that the warp value is greater than a threshold warp value, wherein the dewarped image is generated based on the determination.

Some examples of the method, apparatus, and non-transitory computer readable medium further include computing a reference line between corners of the warped object. Some examples further include identifying a plurality of points along the boundary line. Some examples further include computing a distance between each of the plurality of points and the reference line, wherein the warp value is based on the distances.

FIG. 3 shows an illustrative depiction of a method of dewarping an image using object boundary mask and perspective correction, according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the system can be provided with an image containing a potentially warped object. The image could have been captured by a user 100 using a digital image capture method, where the image can include one or more objects, for example, text, pictures, figures, etc. In some cases, the operations of this step refer to, or may be performed by, a user as described with reference to FIG. 1.

At operation 310, the system detects the presence of warping in an image object. Detection of warping in the image can avoid attempting to dewarp an object in an image that is not actually warped. In some cases, the operations of this step refer to, or may be performed by, an image dewarping apparatus as described with reference to FIGS. 1 and 2.

At operation 315, the system generates a boundary mask for the warped object. The boundary mask may be created for an object in the image that has been determined to be warped, where the boundary mask may be created by a machine learning model (e.g., a boundary mask model). In some cases, the operations of this step refer to, or may be performed by, an image dewarping apparatus as described with reference to FIGS. 1 and 2.

At operation 320, the system identifies corners of the warped object based on the boundary mask. The corners may be identified by thinning the detected thick object boundary of the object boundary mask, and generating a plurality of estimated straight lines from the thinned line, where the estimated lines intersect at estimated corners. In some cases, the operations of this step refer to, or may be performed by, an image dewarping apparatus as described with reference to FIGS. 1 and 2.

At operation 325, the system calculates parametric curves and a mesh for the object. In various embodiments, the system calculates a parametric curve from the estimated lines and corners, where the parametric curves can be $C^2$ continuous Bezier curves generated from the thin boundary line and estimated corners. The system can calculate a mesh overlay for the warped object from the parametric curve. In some cases, the operations of this step refer to, or may be performed by, an image dewarping apparatus as described with reference to FIGS. 1 and 2.

At operation 330, the system calculates the dewarped image based on the curve and mesh overlay, where the object can be dewarped using a perspective correction. In some cases, the operations of this step refer to, or may be performed by, an image dewarping apparatus as described with reference to FIGS. 1 and 2.

FIGS. 4A-4F are an illustrative depiction of a method of dewarping an image object using an object boundary mask and perspective correction, according to aspects of the present disclosure.

Figures 4A, 4B, 4C:
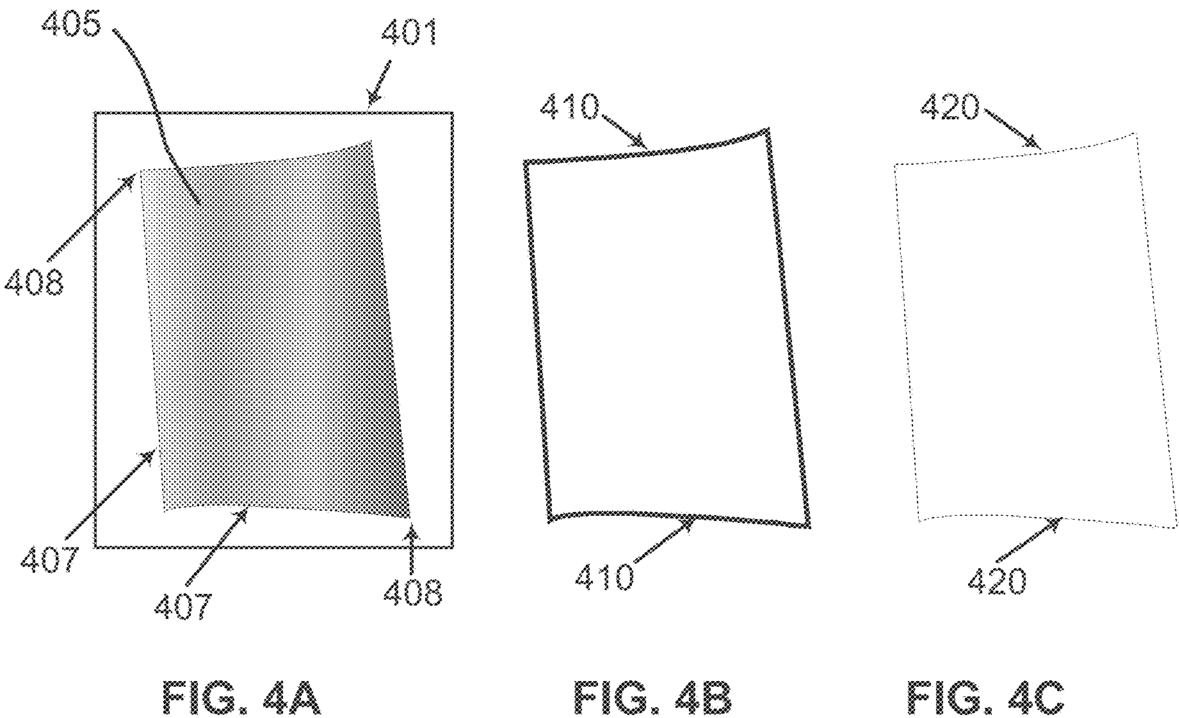
FIGS. 4A-4F are an illustrative depiction of a method of dewarping an image object using an object boundary mask and perspective correction, according to aspects of the present disclosure.

In various embodiments, an original image (e.g., input image 401) can contain an object 405 that is warped due to physical distortions of the object itself, as well as uneven lighting effects on the object 405, as shown in FIG. 4A. The object 405 can be, for example, a book, magazine, pamphlet, flyer, letter, envelope, notes, forms, or other printed article or document that may have a pliable substrate, which can include visual materials, such as text, images, figures/drawings, etc. The object 405 may also be a sign, license plate, sticker, box or packaging having bends, folds, corners, edges, or creases that distort text, images, drawings, or figures. Due to the nature of such printed articles having curved surfaces, folds, wrinkles, creases, tears, and other physical deformations, that may have resulted from handling, storage, etc., the appearance of the object 405 and associated writing can have 3-dimensional (3D) deformations. The warped object image can have object edges 407 that may be curved and may have object corners 408 that do not appear to meet at 90 degrees. For example, the exposed pages of an open book can form a 3-dimensional bowed surface from the natural positioning of the book, and the underlying pages can extend different distances from the edge of the top, exposed page(s), thereby causing an appearance of wider edges that do not lie in a straight line. This can make the edges of the object less distinct, so detecting the object edges 407 of the object can be difficult. Even very minor errors in the location of object corners 408 can render computation results improper for dewarping.

These physical distortions resulting from the 3D contours and curves can deform the visual material present on such surfaces, where the lines of text, figures, and images are also curved and physically distorted, and can have varying depth from a reference viewing plane (depth of field). These variations can render the written material unsuitable for machine recognition and automatic information extraction, for example, such distortions may prevent optical character recognition (OCR) for the warped object.

In various embodiments, the input image 401 of the object 405 may be captured, for example, through digital photography, scanning, or frame extraction from digital video. The input image 401 of the object 405 provided for dewarping may be the original image or a reduced-size image from the original image, where the reduced-size image has a lower resolution than the original image.

In various embodiments, to minimize the time complexity of the algorithm, boundary points can be computed using the smaller-sized image which is a resized version of the input image 401. The original image can be at an original resolution that is larger than the image resolution input to a dewarping apparatus.

At FIG. 4B, an object boundary (e.g., document boundary (DB)) mask 410 can be computed for an input image 401 using a deep learning model (e.g., boundary mask model). A sample object boundary mask 410 can extend around the outer edge of the image of the object 405 and have an edge with a multiple pixel thickness, where the object boundary mask edge thickness can be determined by the training of the deep learning model and predictions of pixels belonging to an object edge 407.

In various embodiments, the object boundary mask 410 can be determined based on a Sobel operator that can detect edges in a digital image (e.g., input image 401), where the Sobel operator is a mathematical manipulation for spatial image filtering that utilizes first order derivatives. The Sobel operator can be implemented as kernels in a Sobel convolution layer of a neural network, for example, in the machine learning model.

In various embodiments, the boundary edges for the object boundary mask 410 detected for the object 405 using the Sobel operator can be wider than the edge transition of a single printed layer, for example, a top, exposed page of a book, where the cascading of the underlying paged can create a less distinct transition for identifying a boundary in the image. Using a Sobel operator, the computed edges of an image 401 can include the object boundary edges as well as interior regions inside the object edges and exterior regions outside the object edges.

In one or more embodiments, object boundary mask 410 is computed from an input image 401 using a deep learning model (e.g., boundary mask model). In various embodiments, the deep learning model can have 16 convolution layers (8 encoder layers and 8 decoder layers), 7 skip connections layers and one custom Sobel convolution layer. Each block in the encoder network can have a convolutional layer followed by, e.g., a Leaky Relu activation function and a batch normalization layer. Each block in a decoder network can have an upsampling layer, followed by a convolutional layer, a batch normalization layer, and a ReLU activation function. The Sobel operator is used to predict the edges in an image, where the Sobel operator can use two 3×3 filters (kernels) to calculate approximations of the derivatives.

In various embodiments, the edge detected image is provided to the Sobel convolution layer that computes the probability of an image pixel belonging to an object edge 407. Because the object edge 407 in the input image 401 may be indistinct, the edge predicted by the boundary mask model and Sobel operators can have a width of greater than a single pixel, where image pixels further away from an actual boundary edge may be identified as belonging to the Sobel edge (i.e., false positive (FP)) and image pixels which do lie on the Sobel edges may not be identified as edge pixels (i.e., false negative (FN).

A convolutional layer can include one or more filter(s) (or kernels) that can be applied pixelwise to a digital image to generate a new array of values that indicate the presence of a particular feature. The filter (kernel) is smaller than the image, and is applied to the image in a stepwise manner, such that the kernel moves relatively across the image. Multiple filters (kernels) can be applied to the image in this manner. The filters can include weights that are predetermined, or may have been learned by the neural network.

In various embodiments, to improve the time complexity and make the model suitable for mobile devices, the model size can be kept at 3 MB and the model takes an input image (e.g., input image 601) of dimension (256×256) and output the object boundary mask of dimension (256×256).

At FIG. 4C, a skeleton boundary line (edge) 420 may first be computed from the object boundary mask 410 (e.g., document boundary (DB) mask) of the object 405 to identify object edges 407 and object corners 408, where a skeleton boundary line 420 is a simplified and topologically equivalent representation of an object image. The skeleton boundary line 420 can be formed by transforming the thick object boundary of the object boundary mask 410 generated by the Sobel edge detection operation to a single-pixel-thin skeleton boundary line 420.

In various embodiments, the skeleton boundary line 420 can be calculated by removing pixels from each side of the thick object boundary of the object boundary mask 410. By removing the outer-most and inner-most pixels of the thick object boundary one layer at a time, a single-pixel-thin line can be obtained for the skeleton boundary line 420, where the object boundary mask 410 can be an image made up of black and white pixels. In various embodiments, an object boundary mask 410 can cover all the pixels inside the thick object boundary. A boundary line, whether it is multiple pixel or single pixel, may also be referred to as a mask, and a skeleton boundary line 420 may also be referred to as a skeleton mask.

Figures 4D, 4E, 4F:
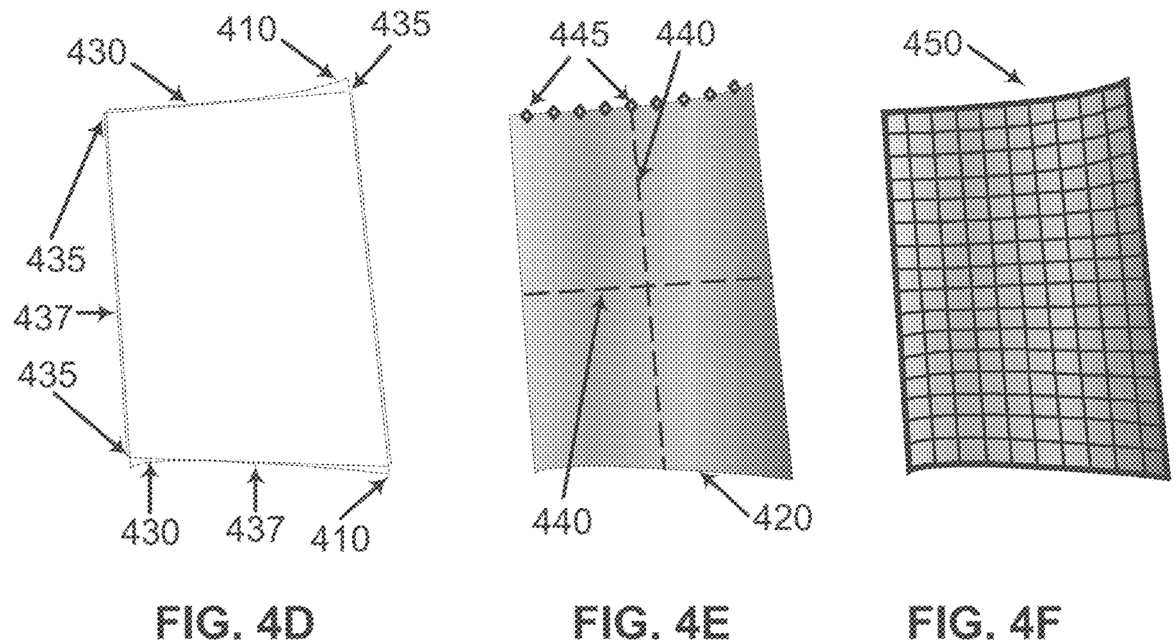

At FIG. 4D, an undistorted object edge can be determined from intersecting Hough lines based on the skeleton boundary line 420.

In various embodiments, estimated lines can be identified from the thin lines. To compute an undistorted object edge, Hough lines can be computed independently along each side of the object 405 based on the skeleton boundary line 420, where the Hough lines are estimated lines of the object edges 407. For each side of the object 405, the Hough line corresponding to the maximum number of underlying black pixels in the skeleton boundary line 420 (i.e., skeleton mask) is chosen, where the calculated Hough lines are straight lines.

In various embodiments, the estimated lines (straight lines representing the maximum number of pixels on the same line (e.g., Hough lines)) for each pair of intersecting edges are considered and the intersecting point of the two estimated lines is identified as a corner point 435. The four corner points 435 may be computed by taking the intersection points of the respective Hough lines, and the resulting quadrilateral 430 generated by joining the four edge lines 437, determined from the straight, intersecting estimated lines, at the four corner points 435, is considered a reference object edge. For example, to compute the top-left document corner, the corresponding top estimated line and the left side estimated line are considered and their intersection point is identified as the upper-left object corner. However, due to the physical deformations, the object edges 407 become warped and the quadrilateral corner points 435 and edge lines 437 (object boundary) may not align with the positions of the warped object corners 408 and object edges 407 in the input image 401 and object boundary mask 410, as shown, for example, in the upper right corner of FIG. 4D.

At FIG. 4E, more precise document corners can be computed.

In various embodiments, the skeleton boundary lines 420 can be divided in half to form four equal quadrants 440. In each quadrant 440, the skeleton boundary line 420 can be further divided into a number of smaller segments, for example, ten (10) segments, and an approximate Hough line can be determined for each of the separate segments. The segments follow the object edge 407, whereas the four edge lines 437 of the quadrilateral 430 form a calculated quadrilateral reference. These segments can establish equidistant document boundary points 445 for subsequent mesh formation.

In various embodiments, the angles between each two consecutive estimated lines (e.g., Hough lines) forming adjoining segments can be calculated, and estimated lines which produce the minimum angle can be identified and recorded as updated lines. This can be repeated to obtain a set of updated lines and the four object corners 608.

In various embodiments, a straight line (L) can be drawn between two opposing vertical or horizontal object corners 408, but not between diagonal object corners. The line between the object corners 408 can be divided into a number of equidistant document boundary points 445. In various embodiments, several equidistant document boundary points 445 on the skeleton boundary line 420 can be calculated for generating a mesh 450, as a collection of polygons.

In various embodiments, for each document boundary points 445, a line perpendicular to L that passes through the division point can be calculated. A point of intersection between the perpendicular line and the actual document boundary can be identified to determine if there is a warp present.

At FIG. 4F, once a $C^2$ continuous curve is computed from the document boundary points 445, the curve can be divided into an equidistant set of points to form a mesh 450.

Computing a mesh 450 for object dewarping based on the document boundary points 445 may not be smooth, and dewarping based on a rough mesh can introduce waves/warps inside the image. In various embodiments, a set of points corresponding to each document boundary point 445 that makes the mesh 450 smooth can be computed.

In various embodiments, smoothing can be performed using a parametric curve, where the parametric curve can be a $C^2$ continuous Bezier curve. The Bezier curve is a parametric curve that produces a set of control points, which define a smooth and continuous curve. The Bezier curve is $C^2$ continuous because the second derivative of the line segment equations are equal at the joining point (a curve is $C^2$ continuous if the curve itself, and the velocity curve, and the acceleration curve, are all continuous). A Bezier curve is called $C^1$ continuous if both the curve and its velocity curve are continuous. A cubic Bezier curve is defined with four points in the plane or higher dimensional space. In various embodiments, a cubic Bezier curve can be used to get a smooth and continuous document boundary from the generated mesh.

In various embodiments, let $P=(P_1, P_2, \ldots, P_n)$ be the set of document boundary points 645. By considering every consecutive pair of points $P_k$ and $P_{k+1}$ in P, the points $A_k$, $B_k$, and $C_k$ can be calculated as follows:

$$B_k = \frac{1}{3}(2P_k + P_{k+1});$$

$$C_k = \frac{1}{3}(P_k + 2P_{k+1}); \text{ and}$$

$$A_{k+1} = \frac{1}{2}(2B_k + C_k).$$

Once $A_k$, $B_k$, and $C_k$ are computed, a Bezier curve can be drawn using the points ($A_k$, $B_k$, $C_k$, $A_{k+1}$). Repeating the algorithm, the consecutive Bezier curves can be calculated with points, $A_1$, $B_1$, $C_1$, $A_2$, and $A_2$, $B_2$, $C_2$, $A_3$. Both the curves form $C^2$ continuous curves. The resulting Bezier curve is $C^2$ continuous and smooth. A total of four $C^2$ continuous curves can be computed for each side of an object, as shown, for example, in FIG. 6E.

In various embodiments, once the $C^2$ continuous curve is computed from the document boundary points 645, the curve can be divided into equidistant set of points for dewarping the object image.

Let $U=\{u_1, u_2, \ldots, u_n\}$, $L=\{l_1, l_2, \ldots, l_n\}$, $R=\{r_1, r_2, \ldots, r_n\}$ and $B=\{b_1, b_2, \ldots, b_n\}$ be the set of n equidistant points on the smooth curve corresponding to upper side, U, left side, L, right side, R, and bottom side, B, of an object 605 (e.g., document), where $u_i=(u_{xi}, u_{yi})$, $l_i=(l_{xi}, l_{yi})$, $r_i=(r_{xi}, r_{yi})$ and $b_i=(b_{xi}, b_{yi})$, each point has x and y coordinate values.

Let the points be $TL=(TL_x, TL_y)$ for top-left corner, $TR=(TR_x, TR_y)$ for top-right corner, $BL=(BL_x, BL_y)$ for bottom-left corner and $BR=(BR_x, BR_y)$ for bottom-right document corners. The upper side deviations (ΔU) of the points in U based on $TL_x$, bottom side deviation (ΔB) of the points in B based on $BL_x$, left side deviation (ΔL) of the points in L based on $TL_y$ and right side deviation (ΔR) of the points in R based on $TR_y$, can be computed as follows:

$$\Delta_{U_i} = u_{x_i} - TL_x;$$

$$\Delta_{B_i} = b_{x_i} - BL_x;$$

$$\Delta_{L_i} = l_{y_i} - TL_y; \text{ and}$$

$$\Delta_{R_i} = r_{y_i} - TR_y.$$

Based on the deviations, the mesh is computed as follows. Let n be the number of divisions of mesh 450 resulting in a total of (n×n) mesh points to be computed. For each mesh point p(x, y), let the distances between the top-left and top-right document corner points and between the top-left and bottom-left document corner points be unity. The horizontal position parameter and vertical position parameter for the point p(x; y) are computed as:

$$\alpha = \frac{\text{Horizontal Position of } p(x, y)}{\text{Number of Divisions}};$$

$$\beta = \frac{\text{Vertical Positions of } p(x, y)}{\text{Number of Divisions}};$$

where $0 \leq \alpha \leq 1$ and $0 \leq \beta \leq 1$.

The point p(x, y) is computed as follows:

$$p_{y_i} = l_{y1} + (\beta \times \Delta_B) + [(1 - \beta) \times \Delta_U];$$

$$p_{x_i} = u_{x1} + (\alpha \times \Delta_R) + [(1 - \alpha) \times \Delta_L].$$

Once the intermediate points of the mesh 450 have been calculated, the $C^2$ continuous Bezier curves are computed to complete the internal polygons of the mesh 450. A sample mesh computed using the algorithm mentioned is shown, for example, in FIG. 4F, and the corresponding dewarped image is computed by performing perspective correction independently on each polygon in the mesh 450, where the perspective correction refers to mapping a quadrilateral region to a rectangular region.

Figure 5:
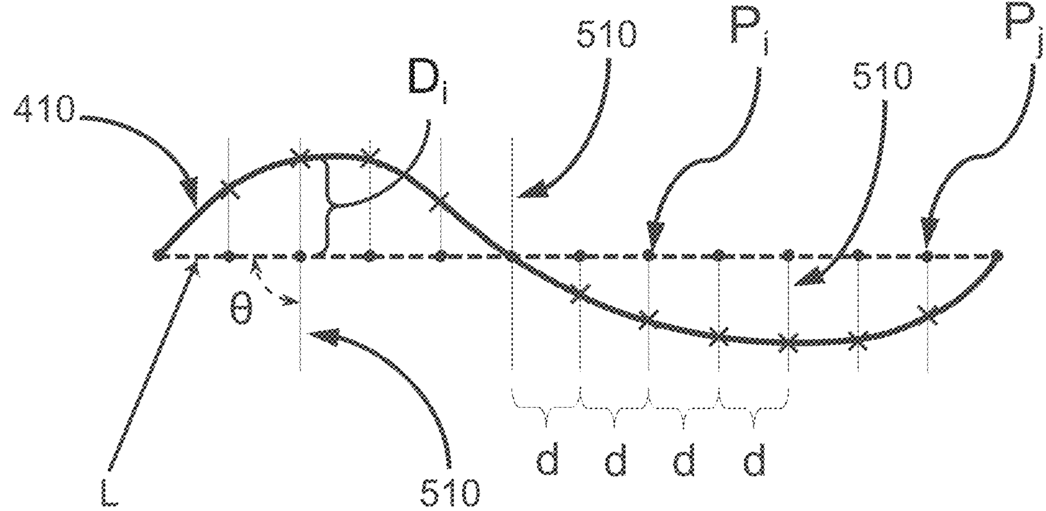
FIG. 5 is an illustrative depiction of a method of determining the presence of warping in an object, according to aspects of the present disclosure.

FIG. 5 is an illustrative depiction of a method of determining the presence of warping in an object, according to aspects of the present disclosure.

A dewarping algorithm should flatten warped documents. However, when applied on documents which are already flattened, the dewarping algorithm can create warps inside such documents. To avoid the aforementioned problem, it should be determined whether or not a document has warping along the edges. The example shown includes object boundary mask 410 and perpendicular line 510 (represented by the dot-dashed line).

In various embodiments, once the document corners are obtained, several equidistant points, $P_i$, $P_j$, can be computed for the document boundary for mesh creation (a collection of polygons). Let L be a straight line between the top-left and top-right document corners where line, L, represents a reference object edge. The line, L, can be divided into a number of equidistant points, P, separated by distance, d. For each division point, P, a perpendicular line 510 to L that passes through the division point, P, can be determined. The system computes the point of intersection between the perpendicular line 510 and the actual document boundary (e.g., object boundary mask 410). The system can repeat the process on each side of the document. Accordingly, several equidistant points around document boundary can be obtained.

Let $P=(P_1, P_2, \ldots, P_n)$ be the set of n points, $P_i$, computed along the reference object edge. For each point, $P_i$, in P, a perpendicular distance, $D_i$, can be computed between L and $P_i$ as the shortest distance. Let $D=(D_1, D_2, \ldots, D_n)$ be the distances computed. The standard deviation (SD) can be calculated by considering all $D_i$. The lower the value of the standard deviation, the less the warp in the document edge. If the value of SD is less than 1, the document edge can be considered to be straight. The process can be repeated independently for each of the document sides and the corresponding standard deviation values can be calculated. If the values of the SD are less than a threshold of 1, then a dewarping algorithm may not be run on the document, which reduces the computational load, and improves the performance when used in mobile devices.

Figure 6:
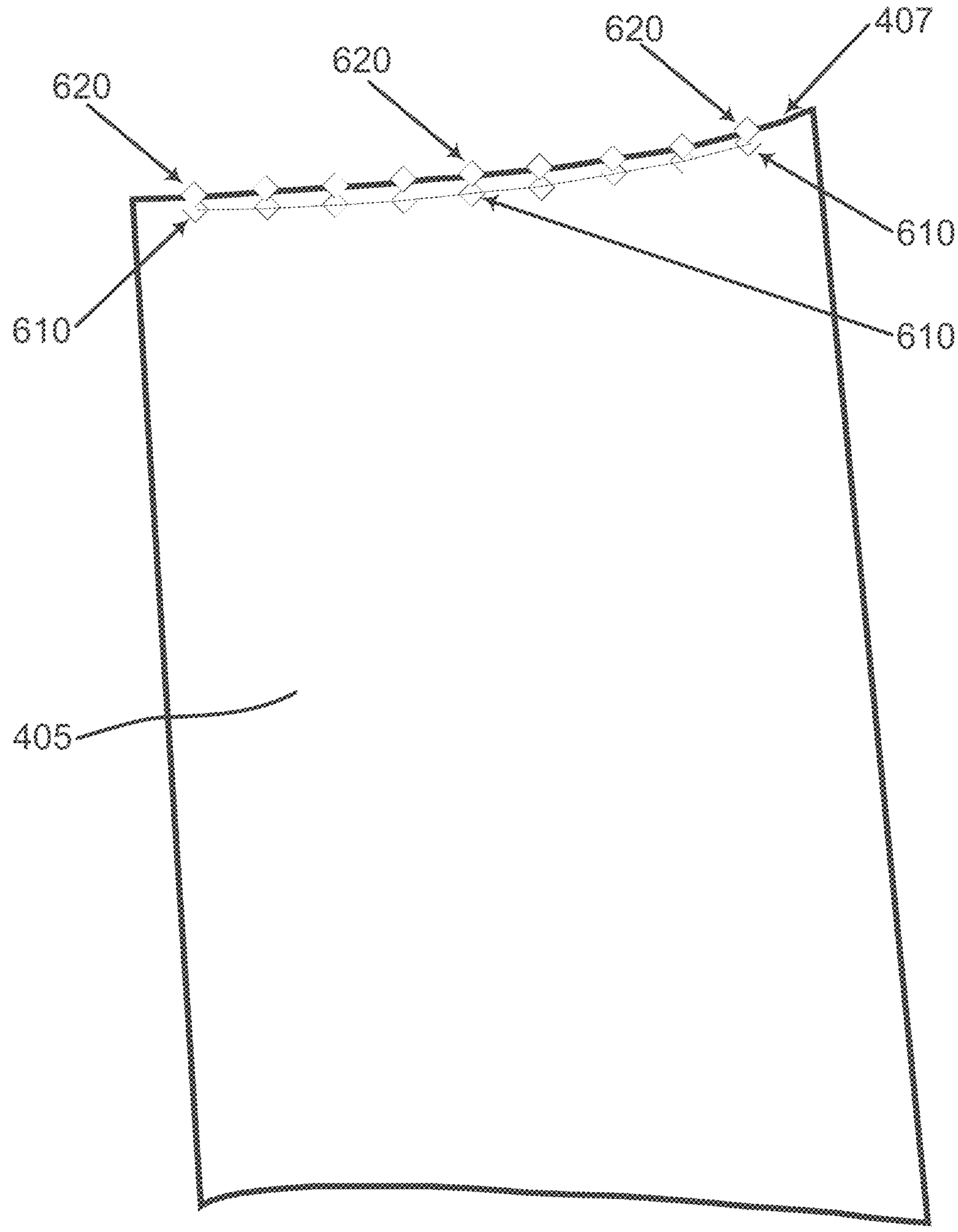
FIG. 6 is an illustrative depiction of a method of aligning boundary points with an object edge, according to aspects of the present disclosure.

FIG. 6 is an illustrative depiction of a method of aligning boundary points with an object edge, according to aspects of the present disclosure.

To minimize the time complexity of the algorithm, the boundary points can be computed for a reduced-size image, which is a resized version of the original input image. Because of the change in scaling, the boundary points 810 calculated for the reduced size image may not align well with the object edge(s) 407 of the object 405 in the full-size original image (e.g., input image 401). Such mis-alignment of boundary points can be adjusted by computing the object boundary mask 410 (e.g., document boundary (DB) mask) of the entire input image 401. The object boundary mask 410 can be computed using an integral image-based thresholding algorithm, where thresholding an image is done by classifying pixels as either "dark" or "light". The boundary points 610 calculated for the reduced size image can be shifted to the object boundary mask 410 to provide the recalibrated points 620 that align with object edges 407.

Adaptive thresholding is a form of thresholding that takes into account spatial variations in illumination, for example, the varying illumination levels on the curved surface of a warped object. Image thresholding segments a digital image based on a certain characteristic of the pixels, and a different threshold value is computed for each pixel in the image. Given f(x, y), an integral image (also referred to as a summed-area table) is a function that maps pixel values to real numbers, for example, pixel intensity, where this can be computed as a sum over a rectangular region of the image. The integral image is a technique that may help speed up the area calculation in an image. Mathematically, it is the summation of information in an upper left area. For each boundary point 610, consider a suitable window center at the boundary point 610 and determine whether the window contains any black pixels. Found black pixels, indicates the boundary point 610 is aligned with the document boundary.

To compute the integral image, the sum of all f(x,y) terms to the left and above the pixel (x,y) are stored at each location, I(x,y):

$$I(x, y) = f(x, y) + I(x-1, y) + I(x, y-1) - I(x-1, y-1).$$

The sum of the function for any rectangle with upper left corner $(x_1, y_1)$, and lower right corner $(x_2, y_2)$ can be computed using the following equation:

$$\sum_{x=x_1}^{x_2} \sum_{y=y_1}^{y_2} f(x, y) = I(x_2, y_2) - I(x_2, y_1 - 1) - I(x_1 - 1, y_2) + I(x_1 - 1, y_1 - 1).$$

If the value of a current pixel is t percent lower than the average then it is set to black, otherwise it is set to white. The average of an s×s window of pixels centered around each pixel can be computed.

A sample object boundary mask along with the boundary points can be generated. The document mask contains black pixels along document boundary. The boundary points 610 can be calibrated using this information, where for each boundary point, a suitable window center at the boundary point 610 can be considered, and it can be determined if the window contains any black pixels. If black pixels are found in the window, that means the boundary point 610 is aligned with the document boundary. The process is repeated independently for each identified boundary pixel to align them with the object boundary mask. Due to the noise or internal structures in the object boundary mask, all the points may not be aligned to their appropriate places. They are corrected in the next step by using the slope information.

On each side of an object boundary, the slopes of the line segments created by using each consecutive boundary points can be maintained. If the slope is not maintained, the mesh created using the boundary points for dewarping the object can have imperfections, and may create an unwanted warping pattern inside the final object image after dewarping.

In each side of a document boundary, maintaining the slopes of the line segments created by using each consecutive boundary points are important. If we do not maintain slope, the mesh created using the boundary points for dewarping document will not be perfect and may create an unwanted warping pattern inside the final dewarped document.

Consider the object boundary mask 410 from machine learning model (OBmask) and the object mask using adaptive thresholding (let $OC_{mask}$). Use DB mask to remove the content from inside of the $OC_{mask}$. The $OC_{mask}$ is the binarized image computed using the adaptive threshold based on integral image computation. This is used to fine-tune the boundary points just before the mesh computation, where the $OB_{mask}$ is computed by the machine learning model at the beginning.

Let P1, P2, P3, and P4 be a few boundary points 610, where P3 and P4 are not properly aligned. This may be done by checking the slope between each pair of consecutive points, for example, the slope between point pairs $P_1$-$P_2$ and point pairs $P_2$-$P_3$ can be check to see if the slopes are similar or not.

Map each point P to the nearby OutlineImage boundary (i.e., the image boundary computed using adaptive thresholding technique based on integral image).

Figure 7:
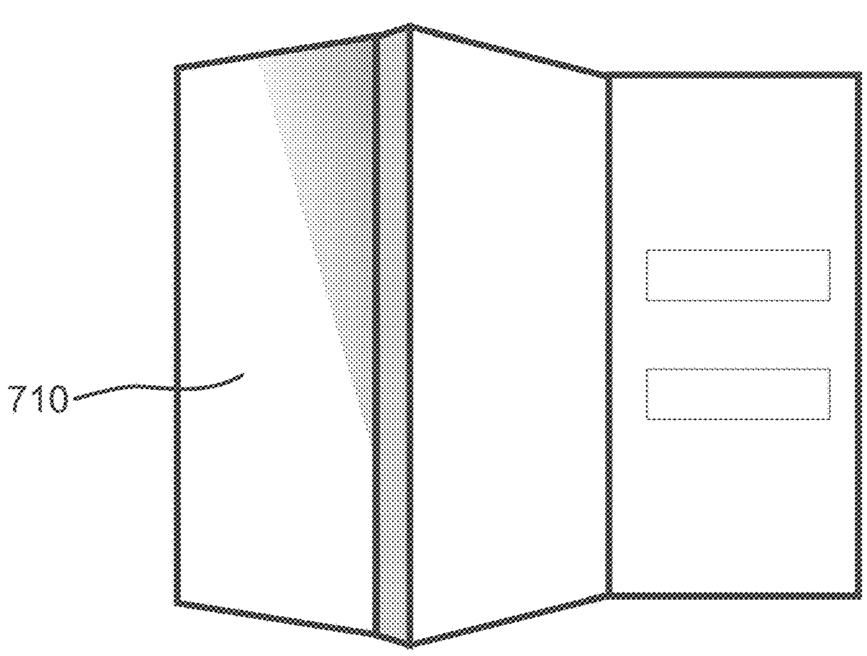
FIG. 7 shows an example of documents with folds and creases that does not lie flat, according to aspects of the present disclosure.
Figure 7:
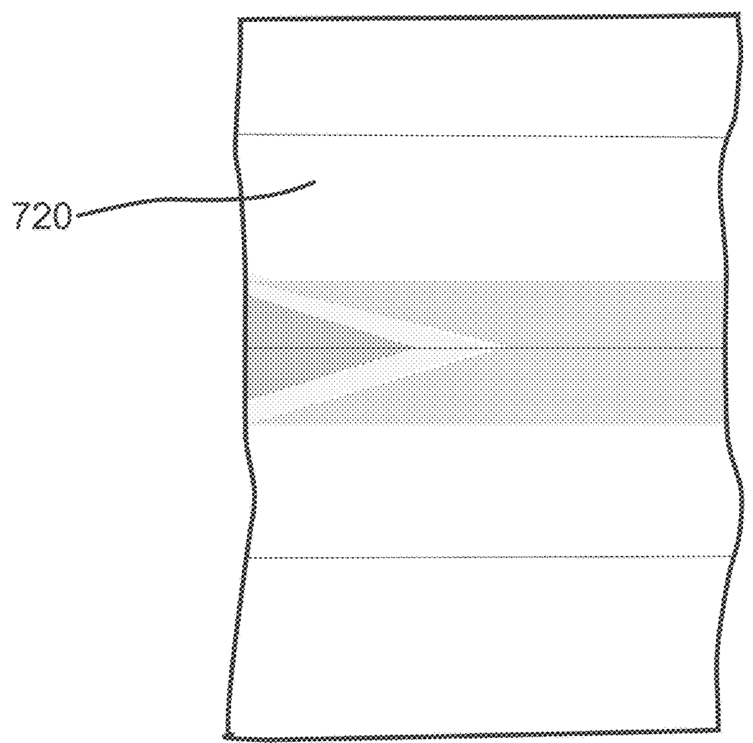

FIG. 7 shows an example of documents with folds and creases that does not lie flat, according to aspects of the present disclosure.

In various embodiments, the object 405 can be documents, for example, pamphlets 710 or forms 720, with folds, creases, wrinkles, etc.

Figure 8:
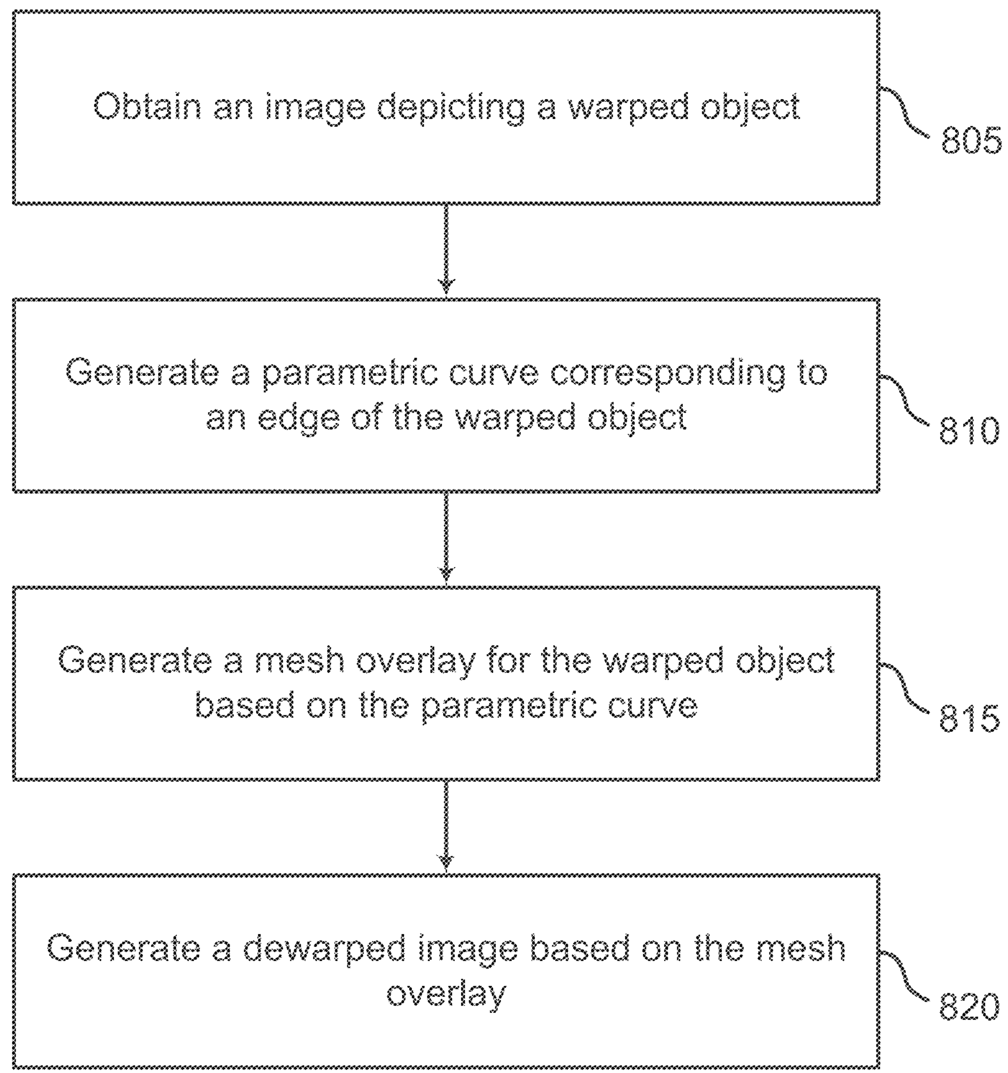
FIG. 8 shows a flow diagram for a method for document dewarping, according to aspects of the present disclosure.

FIG. 8 shows an example of a method for document dewarping according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains an image depicting a warped object. In some cases, the operations of this step refer to, or may be performed by, a machine learning model as described with reference to FIG. 2.

At operation 810, the system generates a parametric curve corresponding to an edge of the warped object. In some cases, the operations of this step refer to, or may be performed by, a curve component as described with reference to FIG. 2.

At operation 815, the system generates a mesh overlay for the warped object based on the parametric curve. In some cases, the operations of this step refer to, or may be performed by, a mesh component as described with reference to FIG. 2.

At operation 820, the system generates a dewarped image based on the mesh overlay. In some cases, the operations of this step refer to, or may be performed by, a dewarping component as described with reference to FIG. 2.

Figure 9:
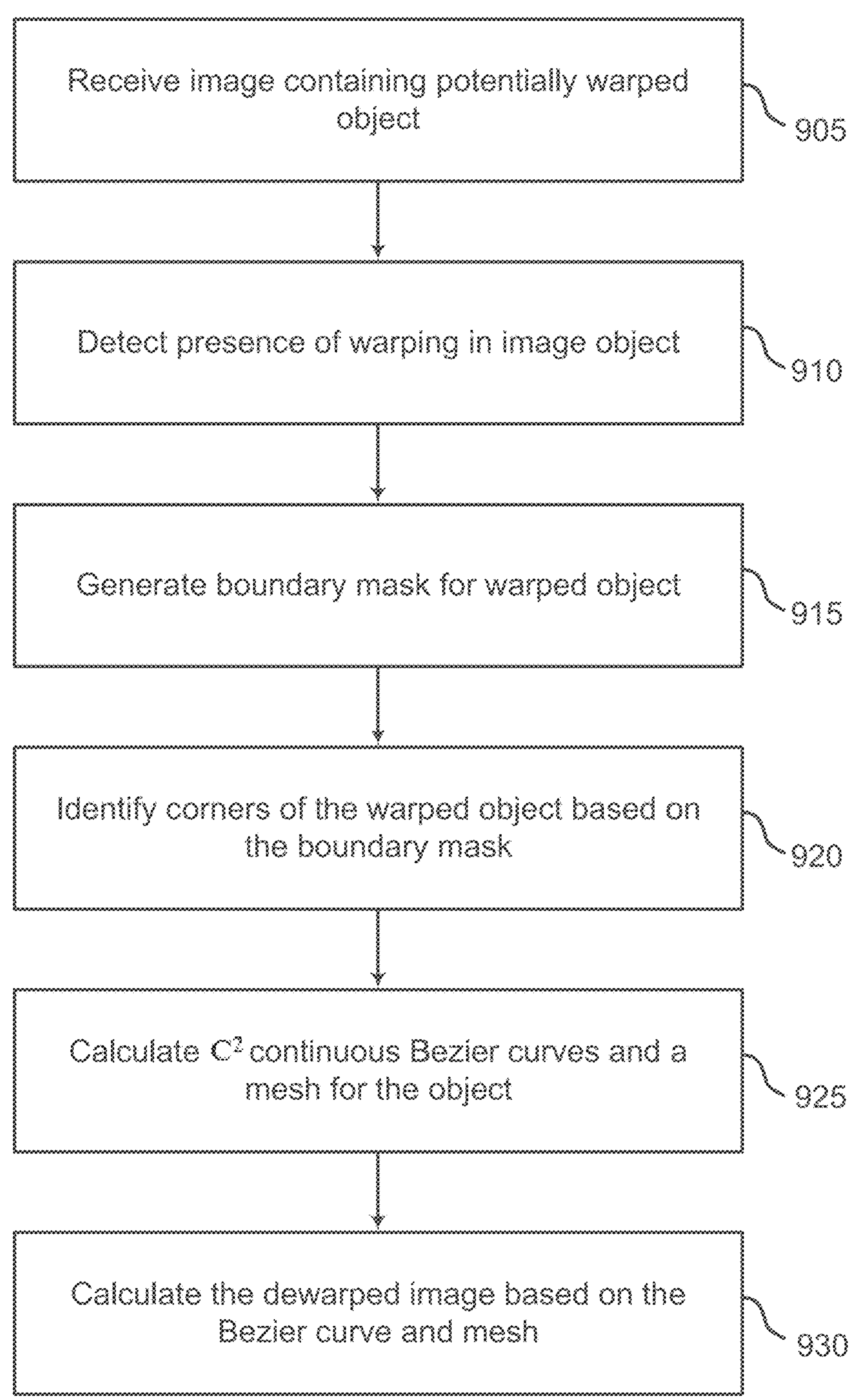
FIG. 9 shows a flow diagram for a method of dewarping an image of an object, according to aspects of the present disclosure.

FIG. 9 shows a flow diagram for a method of dewarping an image of an object, according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives an image containing a potentially warped object. In some cases, the operations of this step refer to, or may be performed by, an image dewarping apparatus as described with reference to FIGS. 1 and 2.

At operation 910, the system detects the presence of warping in image object. In some cases, the operations of this step refer to, or may be performed by, an image dewarping apparatus as described with reference to FIGS. 1 and 2.

At operation 915, the system generates boundary mask for a warped object. In some cases, the operations of this step refer to, or may be performed by, an image dewarping apparatus as described with reference to FIGS. 1 and 2.

At operation 920, the system identifies corners of the warped object based on the boundary mask. In some cases, the operations of this step refer to, or may be performed by, an image dewarping apparatus as described with reference to FIGS. 1 and 2.

At operation 925, the system calculates $C^2$ continuous Bezier curves and a mesh for the object. In some cases, the operations of this step refer to, or may be performed by, an image dewarping apparatus as described with reference to FIGS. 1 and 2.

At operation 930, the system calculates the dewarped image based on the Bezier curve and mesh. In some cases, the operations of this step refer to, or may be performed by, an image dewarping apparatus as described with reference to FIGS. 1 and 2.

Training and Evaluation

According to an embodiment, a machine learning model is trained to detect a document edge. The training may include receiving a training image including a warped object from a training dataset and ground truth pixel classification data; calculating a loss value comparing an output of the machine learning model to the ground truth pixel classification data; and training the machine learning to generate an object boundary mask for the warped object based on the loss value.

Figure 10:
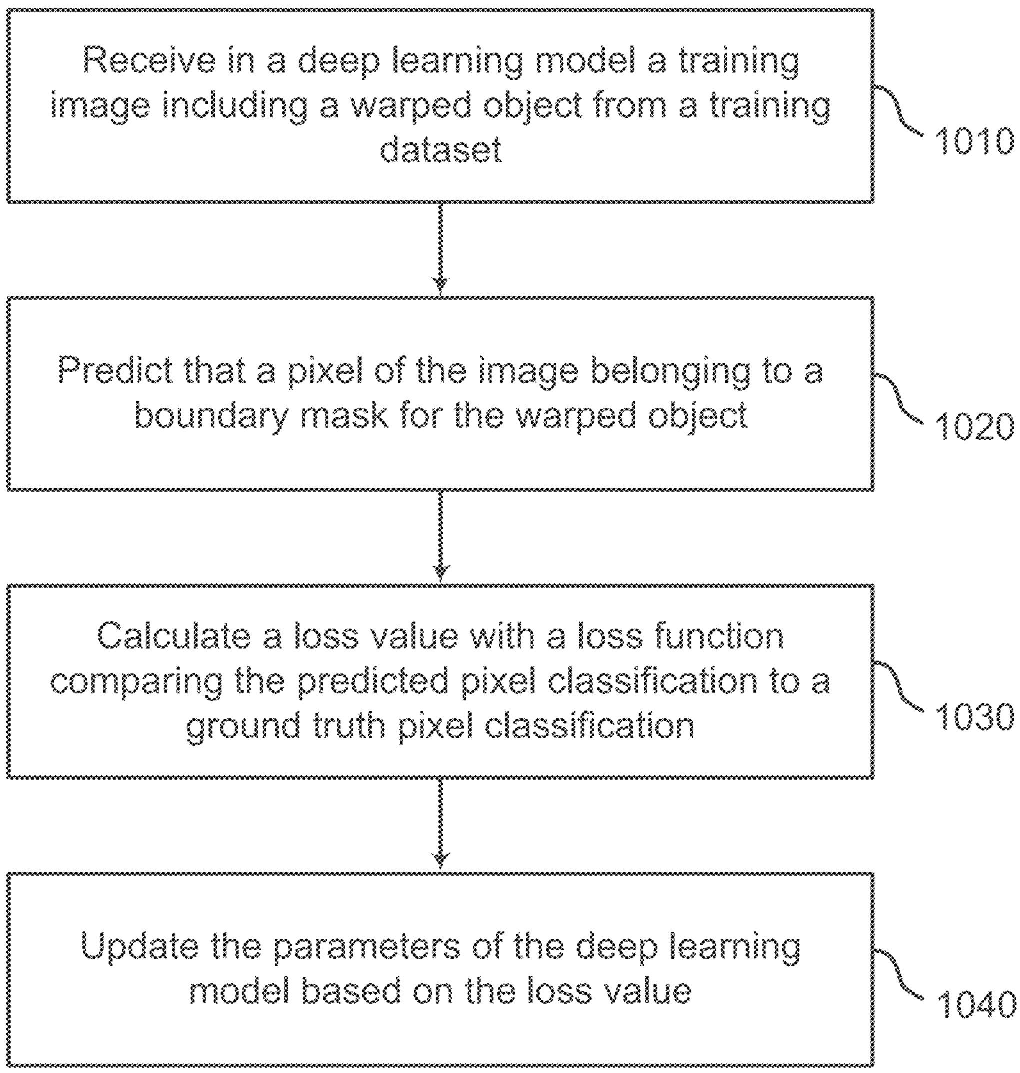
FIG. 10 shows an example of a method for training a dewarping model, according to aspects of the present disclosure.

FIG. 10 shows an example of a method for training a dewarping model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

During the training process, weights of a machine learning model are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1010, the system receives, e.g. at a deep learning model 220, a training image including a warped object from a training dataset. In some cases, the operations of this step refer to, or may be performed by, a training component as described with reference to FIG. 2.

At operation 1020, the system predicts that a pixel of the image belonging to a boundary mask for the warped object. In some cases, the operations of this step refer to, or may be performed by, a training component as described with reference to FIG. 2.

At operation 1030, the system calculates a loss value with a loss function comparing the predicted pixel classification to a ground truth pixel classification. In some cases, the operations of this step refer to, or may be performed by, a training component as described with reference to FIG. 2.

At operation 1040, the system updates the parameters of the deep learning model 220 based on the loss value. In some cases, the operations of this step refer to, or may be performed by, a training component as described with reference to FIG. 2.

Figure 11:
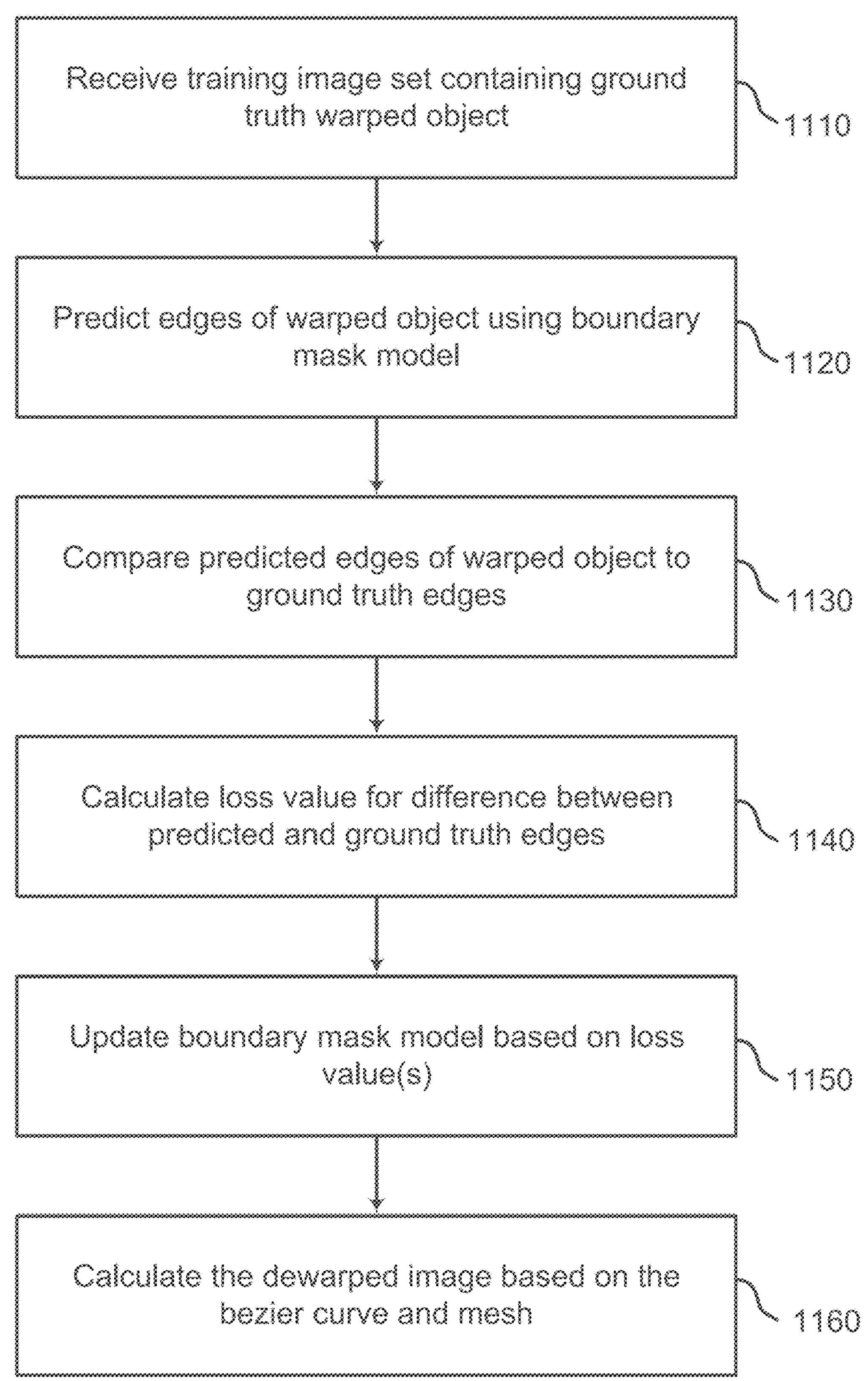
FIG. 11 shows a flow diagram for a method of training a neural network for dewarping an image of an object, according to aspects of the present disclosure.

FIG. 11 shows a flow diagram for a method of training a neural network for dewarping an image of an object, according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1110, the system receives training image set, where the training images contain a ground truth warped object. In some cases, the operations of this step refer to, or may be performed by, a training component as described with reference to FIG. 2.

At operation 1120, the system predicts edges of warped object using a boundary mask model. In some cases, the operations of this step refer to, or may be performed by, a training component as described with reference to FIG. 2.

At operation 1130, the system compares predicted edges of the warped object to ground truth edges, where the predicted edges can be formed by a plurality of predicted pixels that are compared to ground truth pixels. In some cases, the operations of this step refer to, or may be performed by, a training component as described with reference to FIG. 2.

At operation 1140, the system calculates the loss value for a difference between predicted and ground truth edges (pixels) using machine learning model 220. In some cases, the operations of this step refer to, or may be performed by, a training component as described with reference to FIG. 2.

At operation 1150, the system updates the boundary mask model of deep learning model 220 based on the loss value (s). In some cases, the operations of this step refer to, or may be performed by, a training component as described with reference to FIG. 2.

At operation 1160, the system calculates the dewarped image based on the Bezier curve and mesh. In some cases, the operations of this step refer to, or may be performed by, a training component as described with reference to FIG. 2.

In various embodiments, a new dataset is created with 200 real life scanned documents that resembles frequent document types scanned by users. The dataset can be captured using an Adobe® Scan mobile application in different environmental lighting conditions and with various distortions.

In various embodiments, the loss function of the model is derived from the Sobel edge detected output, distance loss, and group loss, where the loss value can be calculated based on Sobel edge detection. The loss for the pixels which lie on the Sobel edges is reduced which makes the training more aligned to output pixels on the document boundary. Training can be based on a ground truth edge. The distance loss is defined as follows. Loss is more for the pixels away from the ground truth. For example, if a pixel is a background pixel but has been classified as foreground pixel, it is a false positive (FP) case. An FP near the true document boundary is more acceptable than a distant one. For group loss, a pixel loss is less for correct pixels found in a group of pixels in neighbor. For example, if a pixel is a foreground pixel but has been classified as background pixel, it is a false negative (FN) case. If there are many spatially co-occurring FN predictions, they will all contribute to each other's loss, heavily penalizing larger sections of missed foreground (i.e., document boundary).

In various embodiments, to train the network, a real-world dataset of approximately 15000 images is collected and their exact document outline is annotated manually. A synthetic dataset can also be created with different backgrounds in various lighting conditions.

A quantitative evaluation was done based on multi-scale structural similarity (MS-SSIM) and the local distortions (LD), where LD values, as computed using the disclosed features, are 9.23, which is better than DewarpNet and DocUNet. The MS-SSIM values as computed using an embodiment of the disclosure are 0.46, which are better than DewarpNet and DocUNet. The existing algorithms fail to identify the correct document boundaries, and hence cannot dewarp the documents, whereas the present algorithm is successfully able to dewarp documents.

Figure 12:
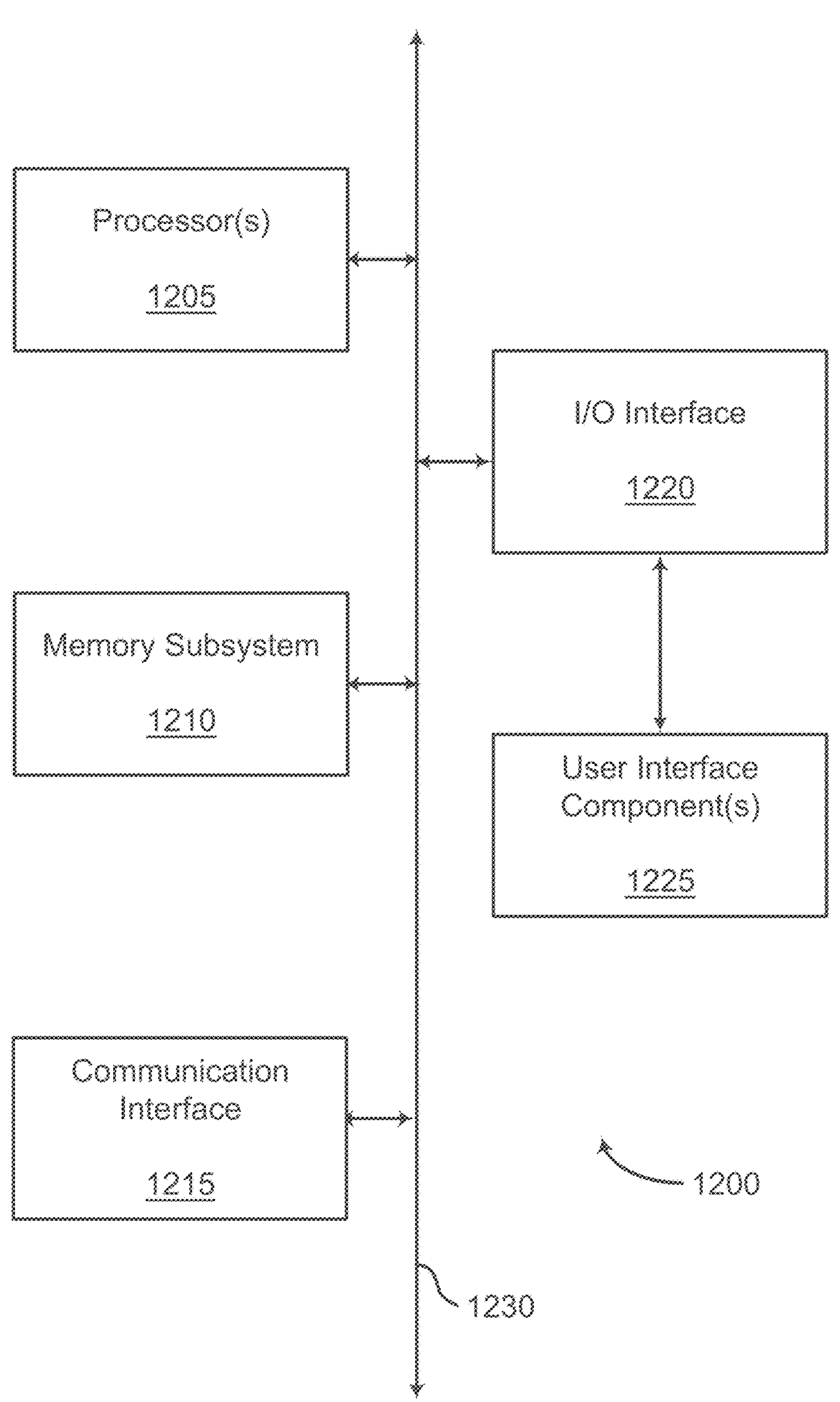
FIG. 12 shows an example of an image dewarping system, according to aspects of the present disclosure.

FIG. 12 shows an example of an image dewarping system according to aspects of the present disclosure. The example shown includes computing device 1200, processor(s) 1205, memory subsystem 1210, communication interface 1215, I/O interface 1220, user interface component(s) 1225, and channel 1230. In some embodiments, computing device 1200 is an example of, or includes aspects of, the image dewarping apparatus as described with reference to FIGS. 1-2.

According to some aspects, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some aspects, user interface component(s) 1225 enable a user to interact with computing device 1200. In some cases, user interface component(s) 1225 include an audio device, such as an external speaker system, an external display device such as a display screen, an input device (e.g., a remote-controlled device interfaced with a user interface directly or through the I/O controller), or a combination thereof. In some cases, user interface component(s) 1225 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method, comprising:

obtaining an image depicting a warped object;

generating, using a machine learning model, predicted pixel classification data predicting whether a pixel of the image is located on an edge of the warped object;

generating a parametric curve corresponding to the edge of the warped object based on the predicted pixel classification data, wherein the parametric curve is selected to overlap a maximum number of pixels on the edge of the warped object based on the predicted pixel classification data;

computing a plurality of points along the parametric curve, wherein the plurality of points are equidistant along the parametric curve corresponding to the edge of the warped object;

generating a plurality of lines corresponding to the plurality of points, respectively;

generating a mesh overlay for the warped object based on the plurality of lines; and generating a dewarped image based on the mesh overlay.

2. The method of claim 1, further comprising:

generating an object boundary mask for the warped object using the machine learning model, wherein the parametric curve is generated based on the object boundary mask.

3. The method of claim 2, further comprising:

computing a boundary line by removing pixels from the object boundary mask, wherein the parametric curve is generated based on the boundary line.

4. The method of claim 3, further comprising:

computing a corner point for the warped object based on the boundary line, wherein the parametric curve is generated based on the corner point.

5. The method of claim 4, further comprising:

computing an angle between the plurality of lines; and generating an updated line based on the angle, wherein the corner point is computed based on the updated line.

6. The method of claim 1, further comprising:

generating a plurality of lines corresponding to the plurality of points, respectively, wherein the mesh overlay is based on the plurality of lines.

7. The method of claim 1, further comprising:

computing a plurality of parametric curves corresponding to a plurality of edges of the warped object, respectively;

computing a plurality of points along each of the plurality of parametric curves; and connecting the plurality of points to obtain the mesh overlay.

8. The method of claim 1, further comprising:

computing a warp value for the warped object; and determining that the warp value is greater than a threshold warp value, wherein the dewarped image is generated based on the determination.

9. The method of claim 8, further comprising:

computing a line between corners of the warped object;

identifying a plurality of points along the edge; and computing a distance between each of the plurality of points and the line, wherein the warp value is based on the distance.

10. The method of claim 1, further comprising:

obtaining a low-resolution version of the image and a high-resolution version of the image;

computing a plurality of boundary points based on the low-resolution version; and calibrating the plurality of boundary points based on the high-resolution version to obtain a plurality of updated boundary points, wherein the parametric curve is based on the plurality of updated boundary points.

11. The method of claim 1, wherein:

the parametric curve is a $C^2$ Bezier curve.

12. The method of claim 1, further comprising:

identifying a plurality of polygons of the mesh overlay; and performing a perspective correction independently for each of the plurality of polygons, wherein the dewarped image is based on the perspective correction.

13. An apparatus for document dewarping, comprising:

one or more processors; and a memory coupled to and in communication with the one or more processors, wherein the memory includes instructions executable by the one or more processors to perform operations including:

obtain an image depicting a warped object;

generating, using a machine learning model, predicted pixel classification data predicting whether a pixel of the image is located on an edge of the warped object;

generate, using a curve component, a parametric curve corresponding to the edge of the warped object based on the predicted pixel classification data, wherein the parametric curve is selected to overlap a maximum number of pixels on the edge of the warped object based on the predicted pixel classification data;

computing, using the machine learning model, a plurality of points along the parametric curve, wherein the plurality of points are equidistant along the parametric curve corresponding to the edge of the warped object;

generating, using the machine learning model, a plurality of lines corresponding to the plurality of points, respectively;

generate, using a mesh component, a mesh overlay for the warped object based on the plurality of lines; and generate, using a dewarping component, a dewarped image based on the mesh overlay.

14. The apparatus of claim 13, further comprising:

generate an object boundary mask for the warped object using the machine learning model, wherein the parametric curve is generated based on the object boundary mask.

15. The apparatus of claim 14, wherein:

the machine learning model comprises a plurality of convolution layers.

16. A method comprising:

receiving, at a machine learning model, a training image including a warped object from a training dataset and ground truth pixel classification data, wherein the ground truth pixel classification data indicates whether a pixel of the training image is located on a boundary of the warped object;

generating predicted pixel classification data predicting whether the pixel is located on the boundary of the warped object;

calculating a loss value by comparing the predicted pixel classification data to the ground truth pixel classification data; and training the machine learning model to generate an object boundary mask for the warped object based on the loss value.

17. The method of claim 16, further comprising:

receiving a training image set containing the ground truth pixel classification data for the warped object and a ground truth edge of the warped object.

18. The method of claim 16, further comprising:

predicting an edge of the warped object using a boundary mask model; and calculating an edge loss value based on a difference between the predicted edge and a ground truth edge of the warped object.

19. The method of claim 18, further comprising:

updating parameters of the machine learning model based on the calculated edge loss value.

20. The method of claim 19, wherein:

the edge loss value is calculated based on Sobel edge detection.

* * * * *